(12) United States Patent
Roylance et al.

(10) Patent No.: US 10,972,683 B2
(45) Date of Patent: *Apr. 6, 2021

(54) CAPTIONING COMMUNICATION SYSTEMS

(71) Applicant: Sorenson IP Holdings, LLC, Salt Lake City, UT (US)

(72) Inventors: Shane Roylance, Farmington, UT (US); Kenneth Boehme, South Jordan, UT (US); Pat Nola, Salt Lake City, UT (US); Merle L. Walker, III, Sandy, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/101,115

(22) Filed: Aug. 10, 2018

(65) Prior Publication Data

US 2018/0352173 A1 Dec. 6, 2018

Related U.S. Application Data

(63) Continuation of application No. 15/369,582, filed on Dec. 5, 2016, now Pat. No. 10,051,207, which is a
(Continued)

(51) Int. Cl.
*H04N 5/278* (2006.01)
*H04N 7/14* (2006.01)
(Continued)

(52) U.S. Cl.
CPC .......... *H04N 5/278* (2013.01); *G09B 21/009* (2013.01); *H04L 61/1594* (2013.01);
(Continued)

(58) Field of Classification Search
USPC ................................................ 379/37–52
See application file for complete search history.

(56) References Cited

U.S. PATENT DOCUMENTS

| 4,777,469 A | 10/1988 | Engelke et al. |
| 4,959,847 A | 9/1990 | Engelke et al. |

(Continued)

FOREIGN PATENT DOCUMENTS

| CN | 101500127 A | 8/2009 |
| CN | 104780335 A | 7/2015 |

(Continued)

OTHER PUBLICATIONS

CaptionCall, LLC, Stay Connected With CaptionCalll, website: http://captioincallphone.com/?source={source}&medium={medium}&term={term}&gclid=CPHhjsPK68oCFQI8vQodSHkEgw; May 2015, 3 pages.
(Continued)

*Primary Examiner* — Maria El-Zoobi
(74) *Attorney, Agent, or Firm* — Maschoff Brennan

(57) ABSTRACT

A method to generate a contact list may include receiving an identifier of a first communication device at a captioning system. The first communication device may be configured to provide first audio data to a second communication device. The second communication device may be configured to receive first text data of the first audio data from the captioning system. The method may further include receiving and storing contact data from each of multiple communication devices at the captioning system. The method may further include selecting the contact data from the multiple communication devices that include the identifier of the first communication device as selected contact data and generating a contact list based on the selected contact data. The method may also include sending the contact list to the first communication device to provide the contact list as contacts for presentation on an electronic display of the first communication device.

14 Claims, 15 Drawing Sheets

Related U.S. Application Data continuation of application No. 15/185,459, filed on Jun. 17, 2016, now Pat. No. 9,525,830, which is a continuation-in-part of application No. 14/939,831, filed on Nov. 12, 2015, now Pat. No. 9,374,536.

(51) Int. Cl.

| | | |
|---|---|---|
| *H04L 29/12* | (2006.01) | |
| *H04M 1/2757* | (2020.01) | |
| *H04L 29/06* | (2006.01) | |
| *H04M 1/725* | (2021.01) | |
| *G09B 21/00* | (2006.01) | |
| *H04L 29/08* | (2006.01) | |

(52) U.S. Cl.
CPC .......... *H04L 65/1069* (2013.01); *H04L 65/60* (2013.01); *H04L 67/2804* (2013.01); *H04M 1/72591* (2013.01); *H04N 7/141* (2013.01); *H04N 7/147* (2013.01); *H04M 1/2757* (2020.01)

(56) References Cited

U.S. PATENT DOCUMENTS

| | | |
|---|---|---|
| 5,081,673 A | 1/1992 | Engelke et al. |
| 5,325,417 A | 6/1994 | Engelke et al. |
| 5,327,479 A | 7/1994 | Engelke et al. |
| 5,351,288 A | 9/1994 | Engelke et al. |
| 5,432,837 A | 7/1995 | Engelke et al. |
| D364,865 S | 12/1995 | Engelke et al. |
| 5,581,593 A | 12/1996 | Engelke et al. |
| 5,604,786 A | 2/1997 | Engelke et al. |
| 5,687,222 A | 11/1997 | McLaughlin et al. |
| 5,724,405 A | 3/1998 | Engelke et al. |
| 5,809,425 A | 9/1998 | Colwell et al. |
| 5,815,196 A | 9/1998 | Alshawi |
| 5,909,482 A | 6/1999 | Engelke |
| 5,974,116 A | 10/1999 | Engelke et al. |
| 5,978,654 A | 11/1999 | Colwell et al. |
| 6,075,841 A | 6/2000 | Engelke et al. |
| 6,075,842 A | 6/2000 | Engelke et al. |
| 6,188,429 B1 | 2/2001 | Martin et al. |
| 6,233,314 B1 | 5/2001 | Engelke |
| 6,307,921 B1 | 10/2001 | Engelke et al. |
| 6,493,426 B2 | 12/2002 | Engelke et al. |
| 6,504,910 B1 | 1/2003 | Engelke et al. |
| 6,510,206 B2 | 1/2003 | Engelke et al. |
| 6,549,611 B2 | 4/2003 | Engelke et al. |
| 6,567,503 B2 | 5/2003 | Engelke et al. |
| 6,594,346 B2 | 7/2003 | Engelke |
| 6,603,835 B2 | 8/2003 | Engelke et al. |
| 6,748,053 B2 | 6/2004 | Engelke et al. |
| 6,882,707 B2 | 4/2005 | Engelke et al. |
| 6,885,731 B2 | 4/2005 | Engelke et al. |
| 6,934,366 B2 | 8/2005 | Engelke et al. |
| 7,003,082 B2 | 2/2006 | Engelke et al. |
| 7,006,604 B2 | 2/2006 | Engelke |
| 7,164,753 B2 | 1/2007 | Engelke et al. |
| 7,319,740 B2 | 1/2008 | Engelke et al. |
| 7,502,386 B2 | 3/2009 | Goto |
| 7,526,306 B2 | 4/2009 | Brems et al. |
| 7,555,104 B2 | 6/2009 | Engelke |
| 7,660,398 B2 | 2/2010 | Engelke et al. |
| 7,792,676 B2 | 9/2010 | Klinefelter et al. |
| 7,881,441 B2 | 2/2011 | Engelke et al. |
| 8,213,578 B2 * | 7/2012 | Engleke ............... H04M 11/066 379/52 |
| 8,289,900 B2 | 10/2012 | DuMas et al. |
| 8,379,801 B2 | 2/2013 | Romriell et al. |
| 8,416,925 B2 | 4/2013 | Engelke et al. |
| 8,447,362 B2 | 5/2013 | Takeoka et al. |
| 8,577,895 B2 | 11/2013 | Gupta et al. |
| 8,634,861 B2 | 1/2014 | Repka |
| 8,832,190 B1 | 9/2014 | Leske et al. |
| 8,908,838 B2 | 12/2014 | Engelke et al. |
| 8,913,099 B2 | 12/2014 | Tsang et al. |
| 8,917,821 B2 | 12/2014 | Engelke et al. |
| 8,917,822 B2 | 12/2014 | Engelke et al. |
| 9,215,409 B2 | 12/2015 | Montero et al. |
| 9,219,822 B2 | 12/2015 | Baccay et al. |
| 9,247,052 B1 | 1/2016 | Walton |
| 9,350,857 B1 | 5/2016 | Engelke et al. |
| 9,443,518 B1 * | 9/2016 | Gauci .................... G10L 15/26 |
| 9,462,230 B1 * | 10/2016 | Agrawal ............... H04N 5/783 |
| 2005/0086699 A1 | 4/2005 | Hahn et al. |
| 2007/0036282 A1 | 2/2007 | Engelke et al. |
| 2007/0058681 A1 | 3/2007 | Bettis et al. |
| 2007/0064743 A1 | 3/2007 | Bettis et al. |
| 2007/0207782 A1 | 9/2007 | Tran |
| 2008/0094467 A1 * | 4/2008 | An ........................ H04N 7/142 348/14.02 |
| 2008/0187108 A1 * | 8/2008 | Engelke .............. H04M 1/2475 379/52 |
| 2010/0031180 A1 | 2/2010 | Shin et al. |
| 2010/0279659 A1 | 11/2010 | Harish |
| 2011/0123003 A1 | 5/2011 | Romriell et al. |
| 2011/0170672 A1 | 7/2011 | Engelke et al. |
| 2011/0246172 A1 | 10/2011 | Liberman et al. |
| 2012/0250837 A1 | 10/2012 | Engelke et al. |
| 2013/0005309 A1 | 1/2013 | Clark |
| 2013/0033560 A1 | 2/2013 | Rasalkar et al. |
| 2013/0308763 A1 | 11/2013 | Engelke et al. |
| 2014/0006343 A1 | 1/2014 | Allison |
| 2014/0282095 A1 | 9/2014 | Walters et al. |
| 2015/0011251 A1 | 1/2015 | Parker |
| 2015/0046553 A1 | 2/2015 | DeBenedictis et al. |
| 2015/0094105 A1 | 4/2015 | Pan |
| 2015/0100981 A1 | 4/2015 | Gao et al. |
| 2015/0288927 A1 | 10/2015 | Haginas et al. |
| 2015/0373173 A1 | 12/2015 | Taher |
| 2016/0014164 A1 | 1/2016 | Kashimba et al. |
| 2016/0037126 A1 | 2/2016 | Polyakov et al. |

FOREIGN PATENT DOCUMENTS

| | | |
|---|---|---|
| KR | 20080003494 A | 1/2008 |
| KR | 20120073795 A | 7/2012 |
| WO | 2010148890 A1 | 12/2010 |
| WO | 2015131028 A1 | 9/2015 |

OTHER PUBLICATIONS

3 Play Media; Video Captioning & Transcription Services, website: http://www.3playmedia.com/serviices-features/services/captioning-transcription/, May 2016, 6 pages.

Rupert, Dave, Caption Everything; Using HTML5 to create a real-time closed captioning system; website article, http://daverupert.com/2013/11/caption-everything/, Nov. 13, 2013, 5 pages.

FCC; Internet Protocol (ip) Captioned Telephone Service, website: http://www.fcc.gov/consumers/guides/internet-protocol-ip-captioned-telephone-service, Dec. 10, 2015, 3 pages.

Internet Archive Wayback Machine, archive for Sorenson Ntouch, website: http://web.archive.org/web/20121213084935/http://www.sorensonvrs.com/ntouch/ntouchvp_how_to?video=12038-NVP-VC-SM-Change_e_944x528, as early as Dec. 2012.

Who needs FaceTime? 4 video-calling apps for Android, website: http://www.cnet.com/news/android-video-calling-apps/, Mar. 20, 2015, 7 pages.

* cited by examiner

CAPTIONING COMMUNICATION SYSTEMS

CROSS-REFERENCE TO RELATED APPLICATION

This application is a continuation of U.S. patent application Ser. No. 15/369,582, filed on Dec. 5, 2016, which is a continuation of U.S. patent application Ser. No. 15/185,459, filed on Jun. 17, 2016, now U.S. Pat. No. 9,525,830, which is a continuation-in-part of U.S. patent application Ser. No. 14/939,831, filed Nov. 11, 2015, now U.S. Pat. No. 9,374,536, the disclosures of each of which are hereby incorporated herein by this reference in their entireties.

FIELD

The application relates generally to telecommunications and more particularly to captioning communication systems.

BACKGROUND

Hearing-impaired individuals may benefit from communication systems and devices configured to provide assistance in order to communicate with other individuals over a communication network. For example, captioning services have been established to provide assistive services (e.g., text captions) to the hearing-impaired user communicating with a communication device (e.g., caption phone, caption enabled device, etc.) that is specifically configured to communicate with the captioning service.

For example, FIG. 1 illustrates a conventional communication system 100 configured to facilitate an assisted call between a hearing-impaired user 102 and a far-end user 104. The communication system 100 may include a first communication device 110, a second communication device 120, and a captioning service 130. The first communication device 110 and the second communication device 120 may be coupled together to facilitate communication there between via a first network 140. The first communication device 110 and the captioning service 130 may be coupled together to facilitate communication there between via a second network 150. For example, the first network 140 and the second network 150 may each be implemented according to the standards and bandwidth requirements of a communication network (e.g., Public Switch Telephone Network (PSTN), cellular network, Voice Over Internet Protocol (VOIP) networks, etc.).

The captioning service 130 may be a telecommunication assistive service, which is intended to permit a hearing-impaired person to utilize a communication network and assist their understanding of a conversation by providing text captions to supplement the voice conversation. The captioning service 130 may include an operator, referred to as a "call assistant," who serves as a human intermediary between the hearing-impaired user 102 and the far-end user 104. During a captioning communication session, the call assistant may listen to the audio signal of the far-end user 104 and "revoice" the words of the far-end user 104 to a speech recognition computer program tuned to the voice of the call assistant. Text captions (also referred to as "captions") may be generated by the speech recognition computer as a transcription of the audio signal of the far-end user 104, and then transmitted to the first communication device 110 being used by the hearing-impaired user 102. The first communication device 110 may then display the text captions while the hearing-impaired user 102 carries on a normal conversation with the far-end user 104. The text captions may allow the hearing-impaired user 102 to supplement the voice received from the far-end and confirm his or her understanding of the words spoken by the far-end user 104.

In a typical call, the first communication device 110 may include a device that is configured to assist the hearing-impaired user 102 in communicating with another individual (e.g., far-end user 104), while the second communication device 120 may comprise a conventional voice telephone (e.g., landline phone, cellular phone, smart phone, VoIP phone, etc.) without such abilities and without the capability to communicate with the captioning service 130.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In some embodiments, a method to generate a contact list is disclosed. The method may include receiving an identifier of a first communication device at a captioning system. The first communication device may be configured to provide first audio data to a second communication device during a first communication session between the first communication device and the second communication device. The second communication device may be configured to receive first text data of the first audio data from the captioning system and to receive the first audio data during the first communication session. The method may further include receiving and storing contact data from each of multiple communication devices in a database at the captioning system. The contact data may be retrieved from contact entries stored in the multiple communication devices. In some embodiments, the multiple communication devices may not include the first communication device.

The method may further include selecting, by the captioning system, the contact data from the multiple communication devices that include the identifier of the first communication device as selected contact data and generating, by the captioning system, a contact list based on the selected contact data such that communication devices of the multiple communication devices associated with contacts in the contact list include the first communication device as a contact entry. The method may also include sending the contact list to the first communication device to provide the contact list as contacts for presentation on an electronic display of the first communication device.

The objects and advantages of the embodiments will be realized and achieved at least by the elements, features, and combinations particularly pointed out in the claims.

It is to be understood that both the foregoing general description and the following detailed description are given as examples, are explanatory, and are not restrictive of the invention, as claimed.

BRIEF DESCRIPTION OF THE DRAWINGS

Example embodiments will be described and explained with additional specificity and detail through the use of the accompanying drawings in which.

DETAILED DESCRIPTION

Figure 1:
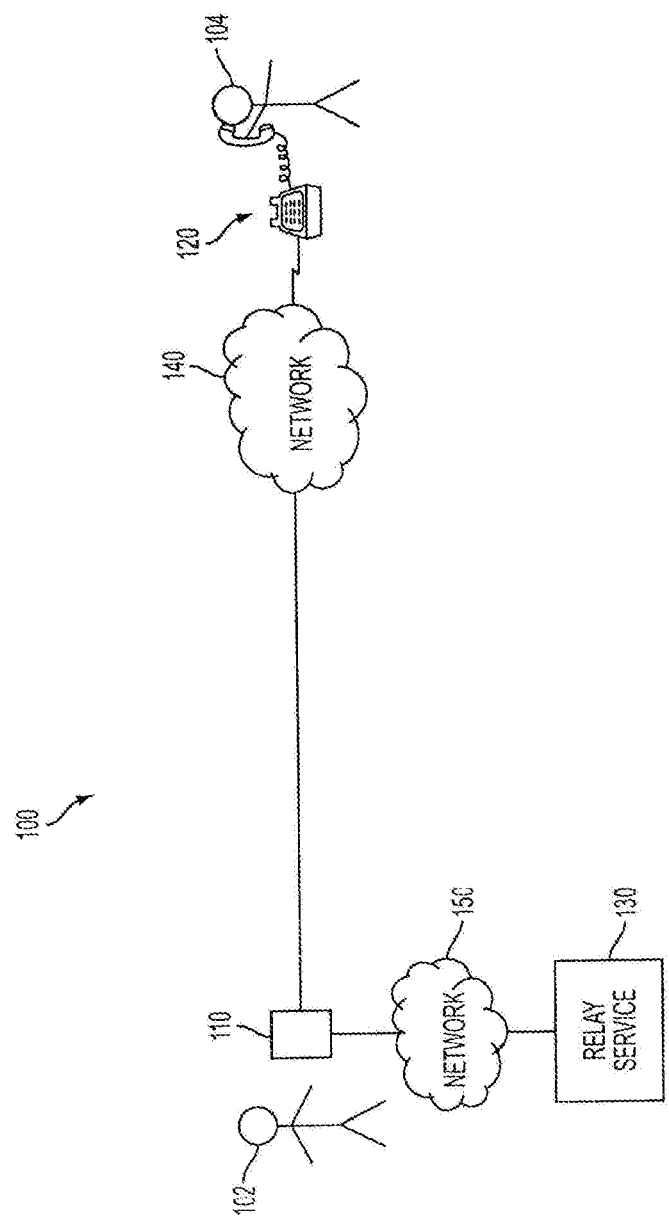
FIG. 1 illustrates a conventional communication system configured to facilitate a call between a hearing-impaired user and a far-end user.

According to some embodiments described in the present disclosure, a video captioning communication system is provided. In some embodiments, the system may be configured to provide a video communication session between a first communication device that is associated with a hearing-impaired user and a second communication device. During the video communication session, the first communication device may provide text captions of audio of the video communication session to the hearing-impaired user.

In some embodiments, the text captions of the audio of the video communication session is provided by the video captioning communication system. For example, in some embodiments, the second communication device may provide video and audio to the first communication device during the video communication session. The audio may also be provided to a video captioning system that may generate a text transcription of the audio. The text transcription may be provided back to the first communication device as text data and presented as a text caption along with the audio and video to the hearing-impaired user of the first communication device.

In some embodiments, a captioning system, such as the video captioning system, may also be configured to generate contact lists for a communication device. For example, a communication device may register with the captioning system and provide an identifier to the captioning system. The captioning system may search contact entries of devices currently registered with the captioning system to determine the contact entries that include the identifier of the communication device. Information about the registered devices that include the contact entries that include the identifier of the communication device may be provided to the communication device as a contact list. The communication device may use the contact list to generate contact entries in the communication device.

As used in the present application, a "hearing-impaired user" may refer to a person with diminished hearing capabilities. Hearing-impaired users of caption-enabled communication devices often have some level of hearing ability that has usually diminished over a period of time such that they can communicate by speaking, but that they often struggle in hearing and/or understanding the far-end user.

The term "call" or "video call" as used in the present disclosure refers to the communication session between the hearing-impaired user's communication device and the far-end user's communication device. The video call may pass audio and/or video signals between the two parties. At times, the video call may be referred to as incoming or outgoing from the perspective of the hearing-impaired user's communication device. Incoming and outgoing video calls may refer to the period of time prior to when the video call is "answered" by the other party to begin the communication of the audio and video signals there between. Generally, when discussing video calls in the present application, they are often referred to from the perspective of the communication device associated with the hearing-impaired user. Thus, an "incoming video call" may originate from a far-end user and be sent to a near-end communication device and an "outgoing video call" may originate from a near-end user and be sent to a far-end communication device. The "near-end" and "far-end" are relative terms depending on the perspective of the particular user. Thus, the terms "near-end" and "far-end" are used as a convenient way to distinguish between different users and to distinguish between different devices, but are used by way of explanation and example and are not limiting.

The term "audio" (or voice) refers to the audio signal generated and transmitted by a communication device during a video call. Most examples are provided from the perspective of a hearing-impaired user using a captioning communication device, such that the audio signal captured by that device is sometimes referred to as the "near-end audio," and the audio signal received to be reproduced by the speaker is sometimes referred to as the "far-end audio." Similarly, the term "video" refers to the video signal generated and transmitted by the communication device during the video call. The video signal captured by the captioning communication device may be referred to as "near-end video," and the video signal received by the captioning communication device may be referred to as the "far-end video."

The use of the terms "network" or "communication network" as used in the present disclosure contemplates networks that are compatible and configured to provide communications using analog and/or digital standards unless specifically stated otherwise. For example, networks may be implemented according to the standards and bandwidth requirements of a communication network (e.g., Public Switch Telephone Network (PSTN), cellular network, Voice Over Internet Protocol (VOIP) networks, etc.).

Embodiments of the disclosure include a video captioning service that is configured to provide interpretive services (e.g., captioning) to the hearing-impaired user for a video communication session. In some embodiments, a human "call assistant" within the video captioning service may be employed to facilitate an assisted call between a hearing-impaired user and a far-end user by providing text captions of at least a portion of the video conversation. In some embodiments, the call assistant may listen to at least the far-end audio received and assist in the generation of the text transcriptions that are transmitted to the first communication device for display on the first communication device as text captions. As a result, the hearing-impaired user may have an improved experience in understanding the conversation. Such a system may be useful for people whose hearing has been damaged or decreased over time (e.g., the elderly), such that they can still speak but have diminished hearing that makes it difficult to communicate. The video captioning services described in the present disclosure may be an improvement over conventional Internet protocol captioned telephone services (IPCTS), captioned telephone service (CTS), or other telecommunications relay services (TRS) that do not provide the ability to provide captions to real-time video communication sessions—particularly for communicating with hearing-capable users who have conventional devices that are not authorized to receive text data for display of text captions during the video communication session.

Figure 2:
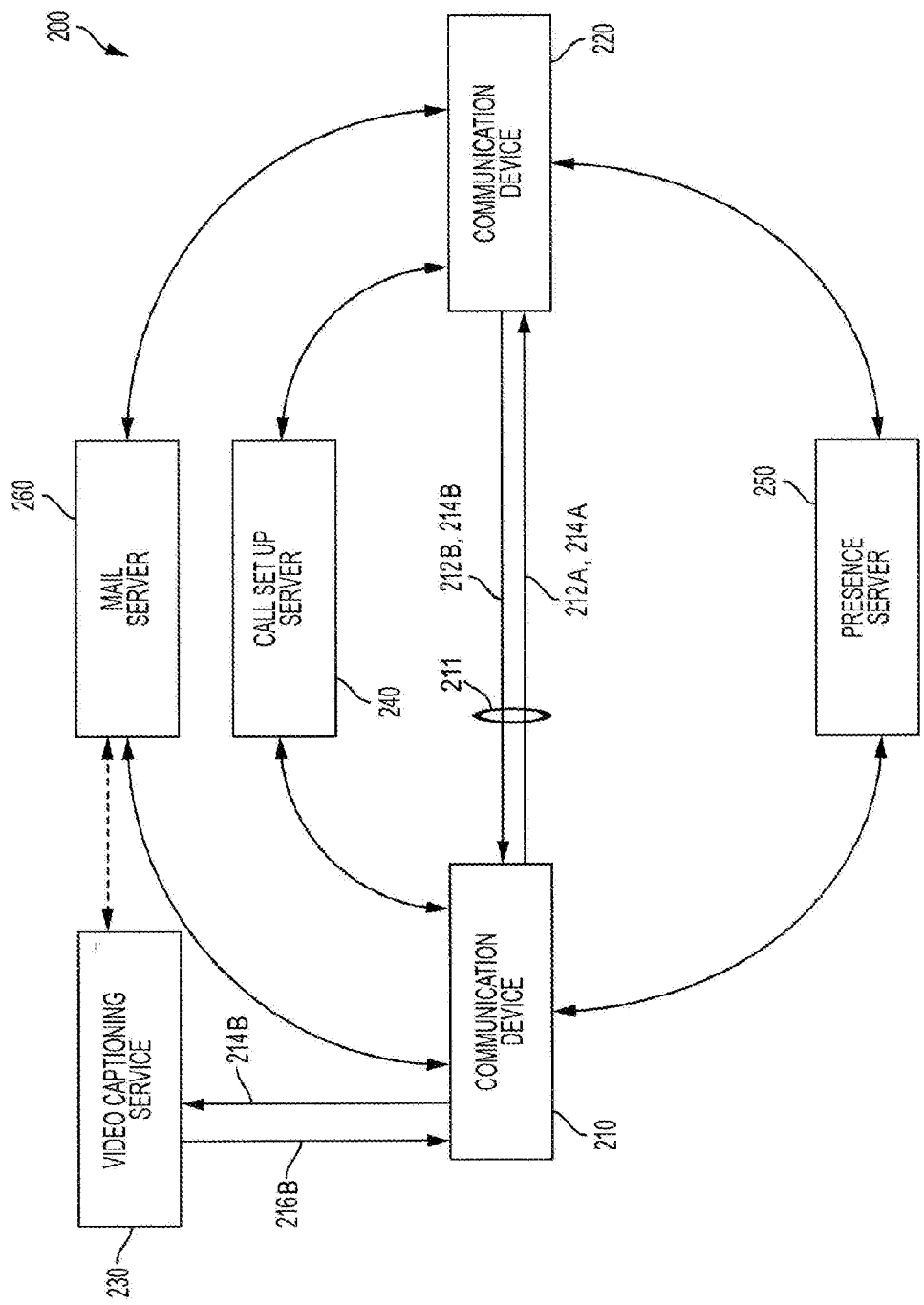
FIGS. 2 through 10 are simplified block diagrams of video captioning communication systems according to some embodiments of the disclosure.

FIG. 2 is a simplified block diagram of a video captioning communication system 200 according to an embodiment of the disclosure. The video captioning communication system 200 may include a first communication device 210, a second communication device 220, and a video captioning service 230. The video captioning communication system 200 may be configured to facilitate an assisted video call between a hearing-impaired user (through the first communication device 210) and a far-end user (through the second communication device 220) during a real-time video communication session during which media data 211 is communicated between the communication devices 210, 220.

The first communication device 210 may be a device (e.g., an endpoint) that is specifically configured to assist a hearing-impaired user communicating with another individual. In some embodiments, the first communication device 210 may include a caption-enabled communication device configured to receive text data and display text captions of at least a portion of a conversation during a video call. Such a caption-enabled communication device may include a caption telephone, a software endpoint running on a mobile device (e.g., laptop, tablet, smart phone, etc.) or other computing device (e.g., desktop computer), a set top box, or other communication device specifically configured to facilitate captioning during a video communication session. Thus, the hearing-impaired user may be able to read the text captions of the words spoken by the far-end user to supplement the audio signal received by the first communication device 210. The first communication device 210 may also include an electronic display and video encoder/decoder that are configured to receive and display real-time video on the first communication device 210, with the text captions being displayed to the hearing-impaired user with the real-time video displayed on the electronic display.

The second communication device 220 may comprise a communication device (e.g., cellular phone, smart phone, VOIP phone, tablet, laptop, etc.) that is configured to capture and provide far-end video 212B and far-end audio 214B from the second communication device 220 to the first communication device 210. Likewise, the second communication device 220 may be configured to receive near-end video 212A and near-end audio 214A from the first communication device 210. In some embodiments, in which hearing-impaired users are on both sides of the conversation, the second communication device 220 may be the same type of device as the first communication device 210. In these and other embodiments, both the first communication device 210 and the second communication device 220 may be authorized to receive text data and display text captions from the video captioning service 230. In some embodiments, the second communication device 220 may not be configured for use by a hearing-impaired user authorized to receive text data and display text captions. In these and other embodiments, the second communication device 220 may be a hearing-capable user device that typically only has voice and video call capabilities without the ability or authorization to receive text data and display text captions from the video captioning service 230. The video captioning service 230 may nevertheless support captioning for the first communication device 210 for providing captioning of the far-end audio 214B to the first communication device 210.

In some embodiments, the video captioning communication system 200 may be a closed system. As a closed system, each communication device participating in a video communication session supported by the video captioning communication system 200 may be required to be registered with the video captioning communication system 200—including those communication devices used by hearing-capable users that are not authorized to receive text data and display text captions from the video captioning service 230. Registering with the video captioning communication system 200 may include registering the communication device with a session initiation protocol (SIP) register associated with the video captioning service 230. In order to transform the second communication device 220 associated with a hearing-capable user into a device that is configured to participate in a supported video call with the video captioning service 230, the video call application provided by the video captioning service 230 may be downloaded and installed on the second communication device 220.

The hearing-impaired user associated with the first communication device 210 may desire to participate in video communication sessions with individuals who do not have a device that is registered with the video captioning service 230 or who have a device that does not have the video call application. The first communication device 210 may be configured to send invitations to devices requesting their users to register and download the video call application to be a participant in the closed video captioning communication system 200. The hearing-impaired user may enter specific numbers (e.g., phone numbers, IP addresses, etc.) into the first communication device 210 or select individuals from their current contact list for sending an invitation thereto. The invitation may be sent as a text message, email message, or other message with information regarding the video captioning service 230, who sent the invitation, and instructions (e.g., hyperlink to a store or site) to download the video call application. In some embodiments, the first communication device 210 may be configured to detect whether a phone number is capable of video communication and deny invitations from being sent to devices that are not capable of video communication (e.g., conventional landline phones).

Within the user interface of the first communication device 210, the user may manage the invitations sent to others. The contact list within the user interface may have an icon indicating whether each individual contact is registered with the video captioning service 230. If so, the icon may also indicate whether the contact is currently available for receiving a video call. If not, the icon may indicate that an invitation may be sent or if an invitation has already been sent without an action being taken. Selecting the icon may initiate an action depending on its state. For example, selecting the icon showing that the corresponding individual is registered with the service and available for a video call may initiate a video call with the second communication device 220 associated with the corresponding individual. Selecting the icon showing that the corresponding individual is not registered with the service may generate and send an invitation to the second communication device 220 associated with the corresponding individual.

Responsive to receiving and accepting the invitation, the second communication device 220 may install the video call application and instruct the hearing-capable user to register with the video captioning service (e.g., by providing user information such as name, email address, phone numbers, etc.). In some embodiments, the registration may occur automatically in that the video captioning service 230 may simply store the associated phone number and other device information that is retrievable without requesting any additional information to be input by the hearing-capable user. In some embodiments, a hearing-capable user may download the video call application and register with the video captioning service 230 through the second communication device 220 without receiving an invitation to register.

In some embodiments, the video captioning service 230 may maintain one or more databases with information about the registered users (both hearing-impaired and hearing-capable users) such as profile information, contact information, invitation status information, video call information, among other information. The video captioning service 230 may link registered users with the contact lists of the other registered users within the video captioning service 230. As a result, even though the second communication device 220 may have been added as a registered device by accepting an invitation from a particular user, the video captioning service 230 may query the contact lists for all registered users and link the second communication device 220 to entries within the contact lists of other registered users. As a result, entries for the second communication device 220 in the contact lists of other registered users may also update to reflect that the second communication device 220 is now registered and capable of participating in video communication sessions in which captions are available to any hearing-impaired users within the video captioning communication system 200.

In some embodiments, through the user interface of the first communication device 210, the hearing-impaired user may manage other functions for the first communication device 210. For example, the first communication device 210 may place outgoing video calls, receive incoming video calls, manage video calls in progress (i.e., established video communication sessions), manage device settings, record a video greeting and/or outgoing message, maintain lists (e.g., contact list, blocked call list, recent call list), etc. In some embodiments, in-call management may include ending a video call (i.e., hanging up), turning on/off captions (which may terminate the connection to the video captioning service 230), changing views of different video feeds, changing how and where captions are displayed, adjusting the camera, muting the microphone, turn off video, etc. In some embodiments, device settings may include camera settings (e.g., pan, tilt, zoom), volume settings, turning on/off video call availability, display settings, ring settings, etc.

In some embodiments, through the user interface of the second communication device 220, the user may manage other functions for the second communication device 220. In general, the second communication device 220 may be configured to manage the same functions as the first communication device 210—particularly if the second communication device 220 is a caption enabled device for a hearing-impaired user. In some embodiments, for devices that are not associated with a hearing impaired user, the video call application installed on the second communication device 220 may not provide functionality to receive text data and display text captions from the video captioning service 230 or other captioning related functions. In some embodiments, the hearing-user of the second communication device 220 may be permitted through the user interface to send invitations to non-registered hearing and/or hearing-impaired users of other communication devices.

In addition to generating text transcriptions and providing text data of a received audio signal for presentation of text captions, the video captioning service 230 may be configured to provide additional functions, such as routing video calls, associating video call applications (for hearing-capable users) with contact lists for the caption enabled devices, storing recorded video greetings, monitoring video call usage, as well as managing invitations and requests. In some embodiments, usage monitoring may include reporting on the number of video calls placed, received, answered, and/or not answered by each device, reporting on the devices using NAT traversal, reporting on the number and/or percentage of contacts that are registered with the video captioning service 230, reporting on the conversion rate of invites vs. video call application installs, among other desired metrics.

In operation, the near-end video 212A and near-end audio 214A may be captured and transmitted from the first communication device 210 to the second communication device 220. Far-end video 212B and far-end audio 214B may be captured and transmitted from the second communication device 220 to the first communication device 210. The video captioning service 230 may be configured to receive the far-end audio 214B and generate a text transcription of the far-end audio 214B for transmission as text data 216B to the first communication device 210 for display on the first communication device 210 as text captions during the video communication session.

As shown in FIG. 2, in some embodiments, the far-end audio 214B may be provided to the video captioning service 230 by the first communication device 210. In other words, FIG. 2 shows a configuration where the first communication device 210 may act as a router to route the far-end audio 214B from the second communication device 220 to the captioning service 230. In these and other embodiments, the far-end audio 214B may be transmitted from the second communication device 220 to the first communication device 210. The far-end audio 214B may be transmitted from the first communication device 210 to the video captioning service 230 for text transcriptions to be generated in a text captioning environment. The text transcriptions may be transmitted from the video captioning service 230 as text data 216B to the first communication device 210 to be displayed as text captions for the hearing-impaired user to read during the conversation by way of the first communication device 210.

In these and other embodiments, a call assistant of the video captioning service 230 may also monitor the text transcriptions that are generated and transmitted to the first communication device 210 to identify any errors that may have been generated by the voice recognition software. The call assistant may correct such errors, such as described in U.S. Pat. No. 8,379,801, issued Feb. 19, 2013, entitled "Methods and Systems Related to Text Caption Error Correction," the disclosure of which is incorporated in the present disclosure in its entirety by this reference. In some embodiments, another device may receive the far-end audio 214B from the second communication device 220 and split the far-end audio 214B to route the far-end audio 214B to both the first communication device 210 and the video captioning service 230.

In addition, although FIG. 2 shows two communication devices 210, 220, the video captioning communication system 200 may include more communication devices. It is contemplated that the video captioning communication system 200 may facilitate communication between any number and combinations of hearing-impaired users and far-end users. For example, in some embodiments two or more communication devices may be connected for facilitating communication between a hearing-impaired user and other hearing-impaired users and/or far-end users. In addition, in some embodiments, the second communication device 220 may be configured similarly as the first communication device (e.g., caption-enabled communication device). As a result, the second communication device 220 may likewise be operated by a hearing-impaired user. Thus, although facilitating communication between the hearing-impaired user and the far-end user is described in some embodiments with respect to FIG. 2 as the far-end user being a hearing-capable user, such a situation is provided only as an example. Other embodiments include both the first communication device 210 and the second communication device 220 being associated with hearing-impaired users and being coupled to the video captioning service 230 to facilitate the captioning services for each respective hearing-impaired user. In these and other embodiments, each communication device 210, 220 may have its own connection with the video captioning service 230 in which the text data is received for display as text captions.

The first communication device 210, the second communication device 220, and the video captioning service 230 may be coupled together to facilitate communication there between via one or more networks that are not shown for simplicity. It should be recognized that the different connections may be different network types (e.g., one PSTN connection, one VOIP connection, etc.), whereas some embodiments may be the same network types (e.g., both connections may be Internet-based connections). The video captioning communication system 200 may further include a call set-up server 240, a presence server 250, and a mail server 260 that may be configured to communicate with one or more of the communication devices 210, 220, and/or the video captioning service 230. The configuration and operation of each of these devices will be discussed further below.

The presence server 250 may be configured to monitor the presence and availability of the different communication devices of the video captioning communication system 200. As discussed above, in some embodiments, the video captioning communication system 200 may be a closed system in that each communication device may be required to be registered and configured to participate in a captioned video call—even those communication devices used by hearing-capable users that are not authorized to receive text data. As a result, the presence server 250 may receive availability updates from the various communication devices registered with the video captioning communication system 200 indicating that the registered communication devices are connected to a suitable network and otherwise available for receiving a video call. End users may log out of the application or otherwise change a setting indicating whether they are available for video calls through the application even if a suitable network connection is present. As a result, prior to a video call being set up, communication devices of the video captioning communication system 200 may be provided by the presence server 250 with the presence or "status" of the different communication devices in their contacts list, recent video call list, or other communication devices of the video captioning communication system 200.

During video call set up, the call set-up server 240 may be configured to set up the video call between the first communication device 210 and the second communication device 220, or other communication devices or endpoints in the video captioning communication system 200. The following example is provided for the situation in which the first communication device 210 initiates a video call with the second communication device 220. The first communication device 210 sends a video call request to the call set-up server 240 with the ID (e.g., IP address, phone number, etc.) of the second communication device 220. The video call request may also have the ID and protocols (e.g., video protocol, audio protocol, etc.) to be used for the video call with the first communication device 210. Suitable media protocols may include, but are not limited to, Real-Time Transport Protocol (RTP), Interactive Connectivity Establishment (ICE) protocols.

The call set-up server 240 sends the video call request to the second communication device 220 for response thereto. As a result, the communication devices 210, 220 may each be supplied with the various known ways to contact the other to establish a communication session, such as a private IP address, a public IP address (e.g., network address translation (NAT), Traversal Using Relay NAT (TURN)), or other similar addresses and methods. Each of the communication devices 210, 220 may attempt to connect with the other through different combinations to find the best option for the connection. Responsive to the second communication device 220 accepting the call request, the video communication session is set up and the media data 211 is communicated between the first communication device 210 and the second communication device 220 when the connection is established. Analogous operations may be followed when the second communication device 220 initiates a video call with the first communication device 210. The user interface of either the first communication device 210 or the second communication device 220 may clearly identify an outgoing call or an incoming call as a video call before the video call is answered such that the user interface may provide a notification that an outgoing call or an incoming call is a video call.

When an incoming video call to the first communication device 210 or the second communication device 220 is not answered, the mail server 260 may be configured to receive and store mail messages. For a video call, the mail server 260 may receive the video mail message from the first communication device 210 and/or the second communication device 220. For example, in some embodiments, the mail server 260 may store the video mail message and send a notification to the first communication device 210 that a new video mail message has been received. For playback of the video mail message, the first communication device 210 may send a request to the mail server 260 for streaming and playback of the video mail message to the first communication device 210. In some embodiments, the video mail message may be stored locally in memory of the first communication device 210.

Text captions may be provided by the video captioning service 230 for the video mail message. In some embodiments, the text data may be generated when the video mail message is recorded and/or saved. For example, when the video mail message is recorded, the far-end audio 214 may be sent to the video captioning service 230 via the first communication device 210, the second communication device 220, or the mail server 260. The text transcription may be generated by the call assistant and/or transcription software and sent by the video captioning service 230 as text data to the location storing the video mail message (e.g., mail server 260, first communication device 210, etc.). The text data may be stored in a separate file from the video mail message. During playback of the video mail message the text data may be retrieved and displayed as text captions with the video data. In some embodiments, the text data may include synchronization information that is used to synchronize the displayed text captions with the audio of the video mail message, with the presentation of the text captions being similar to a live communication session.

In some embodiments, the synchronization information may be adjusted to remove the delay that typically occurs during a live communication session such that the delay of the text captions has been reduced or removed when the video mail message is played by the first communication device 210. In some embodiments, the text captions may be displayed out of synchronization with the audio of the video mail message. For example, at least a portion of the text transcription or the text transcription in its entirety may be displayed as text captions with the video mail message. Such a presentation of the text captions may be in a separate window or portion of the display screen that displays large blocks of the text captions, which may allow the hearing-impaired user to read portions of the text captions even before the corresponding audio is played. In some embodiments, the text captions may be embedded in the video mail message when the video message is saved and/or during playback.

In some embodiments, the text captions may be generated after the video mail message is recorded or saved. For example, the text captions may be generated at the time of playback. In these and other embodiments, the video mail message may be recorded and saved without the text transcription or text data being generated. When the first communication device 210 retrieves the video mail message for playback (whether by streaming or from local storage), the audio from the playback may be sent to the video captioning service 230 to generate text transcription. The text transcription may be sent back to the first communication device 210 as text data for display as text captions. In some embodiments, the audio from the playback may be sent to the video captioning service 230 by the first communication device 210 or directly from the mail server 260 during playback of the video mail message.

In some embodiments, the hearing-impaired user may save the video mail message for later reference after the video mail message has been played. In these and other embodiments, the text transcription may be generated during each playback of the video mail message. Alternately or additionally, the text data from the first playback may be saved and used for subsequent playback with the saved text data being retrieved and/or embedded with the video as discussed above. In some embodiments, stored video mail messages may be captioned prior to being viewed for playback. In these and other embodiments, the video captioning service 230 may retrieve a stored video mail message (or at least the audio thereof) to provide the text captions after the video mail message has been stored, but independent of playback.

Modifications, additions, or omissions may be made to the video captioning communication system 200 without departing from the scope of the present disclosure. For example, in some embodiments, the video captioning communication system 200 may not include the call set-up server 240, the presence server 250, and/or the mail server 260.

FIGS. 3 through 6 are simplified block diagrams of video captioning communication systems 300, 400, 500, 600 according to additional embodiments of the disclosure. FIGS. 3 through 6 have been simplified to only show the first communication device 210, the second communication device 220, and the video captioning service 230 for simplicity of discussion. It should be recognized that the video captioning communication systems 300, 400, 500, 600 may also include a call set-up server, a presence server, a mail server, and/or other components that are configured to execute in a similar manner as with the functionality discussed above with respect to FIG. 2.

Figure 3:
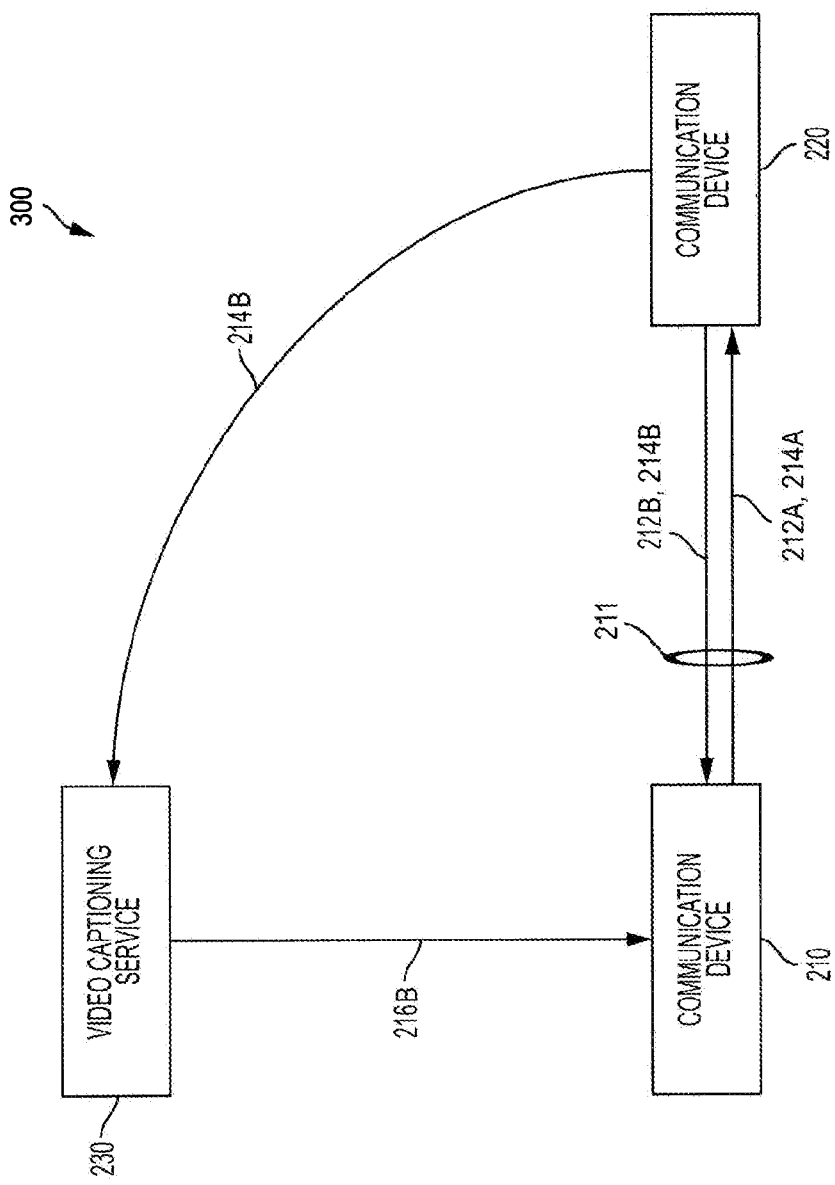

Referring specifically to FIG. 3, the second communication device 220 may be configured to split the far-end video 212B and the far-end audio 214B such that the far-end video 212B may be transmitted to the video captioning service 230 directly and separate from the media data 211 communicated between the first communication device 210 and the second communication device 220. In these and other embodiments, the second communication device 220 may transmit the far-end video 212B and the far-end audio 214B to the first communication device 210 while simultaneously or near to real-time transmitting the far-end video 212B to the video captioning service 230. Sending the far-end audio 214B from the second communication device 220 separately to the first communication device 210 and the video captioning service 230 may reduce some of the delay in generating the text transcription and text data of the far-end audio 214B.

To communicate with both the first communication device 210 and the video captioning service 230, the second communication device 220 may have address information for both the first communication device 210 and the video captioning service 230 even though the first communication device 210 is receiving text data and displaying the text captions for the video communication session. Such information may be provided to the second communication device 220 during video call set-up (e.g., by the call set-up server 240, the first communication device 210, etc.). The video captioning service 230 may also have the address information for the first communication device 210 to be able to direct the text data 216B generated with the text transcription of the far-end audio 214B. The video captioning service 230 may receive the address information during video call set up (e.g., by the call set-up server 240, the first communication device, the second communication device, etc.) or during the video communication session. For example, the address information may be sent with the far-end audio 214B.

Figure 4:
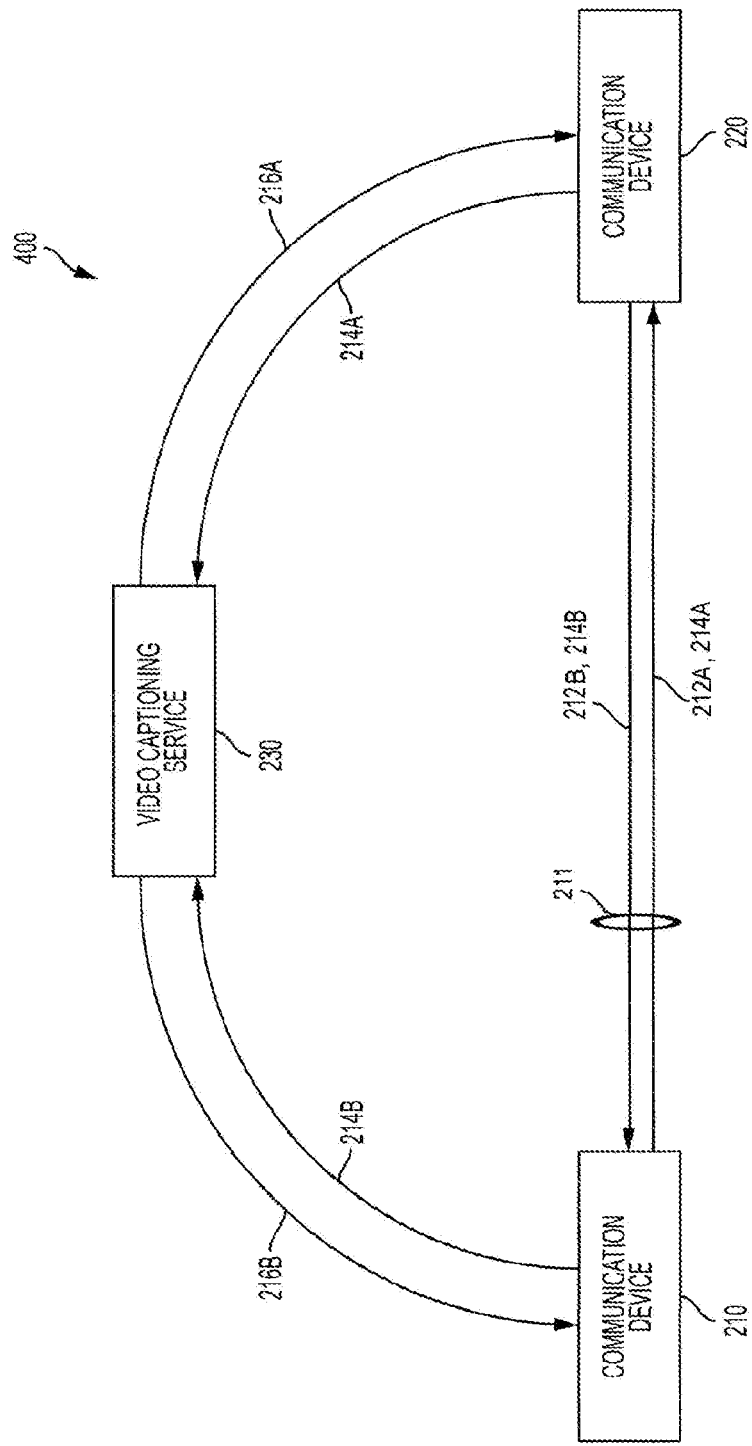

Referring specifically to FIG. 4, an embodiment is illustrated in which both the first communication device 210 and the second communication device 220 are receiving text data and displaying text captions during the video communication session (e.g., both users are hearing-impaired users). In these and other embodiments, the media data 211 may be communicated between the first communication device 210 and the second communication device 220. The first communication device 210 may send the far-end audio 214B to the video captioning service 230, which generates and sends the corresponding text data 216B for the text captions back to the first communication device 210. The second communication device 220 may send the near-end audio 214A to the video captioning service 230, which generates and sends the corresponding text data 216A for the text captions back to the second communication device 220. Thus, the first communication device 210 acts as a router for the far-end audio 214B to the video captioning service 230, and the second communication device 220 acts as a router for the near-end audio 214A to the video captioning service 230. The text transcriptions for the near-end audio 214A and the far-end audio 214B may be generated by different call assistants or sessions within the video captioning service 230.

Figure 5:
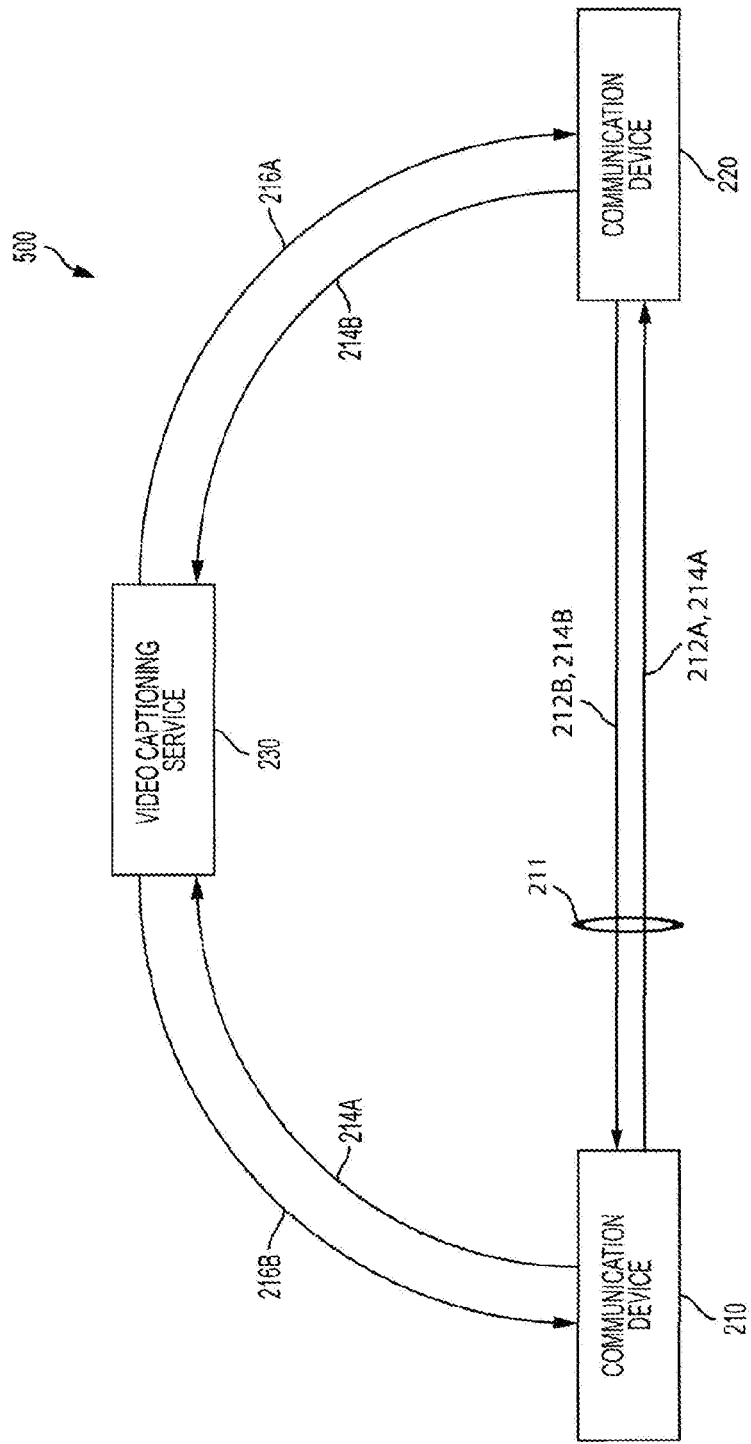

Referring specifically to FIG. 5, an embodiment is illustrated in which both the first communication device 210 and the second communication device 220 are receiving text data and displaying text captions during the video communication session (e.g., both users are hearing-impaired users). In these and other embodiments, the media data 211 may be communicated between the first communication device 210 and the second communication device 220 as discussed above. The first communication device 210 may send the near-end audio 214A to the video captioning service 230, which generates and sends the corresponding text data 216A for the text captions to the second communication device 220. The second communication device 220 may send the far-end audio 214B to the video captioning service 230, which generates and sends the corresponding text data 216B for the text captions to the first communication device 210. Thus, the first communication device 210 and the second communication device 220 send their own audio to the video captioning service 230 but receive the text data corresponding to the other device from the video captioning service 230.

Figure 6:
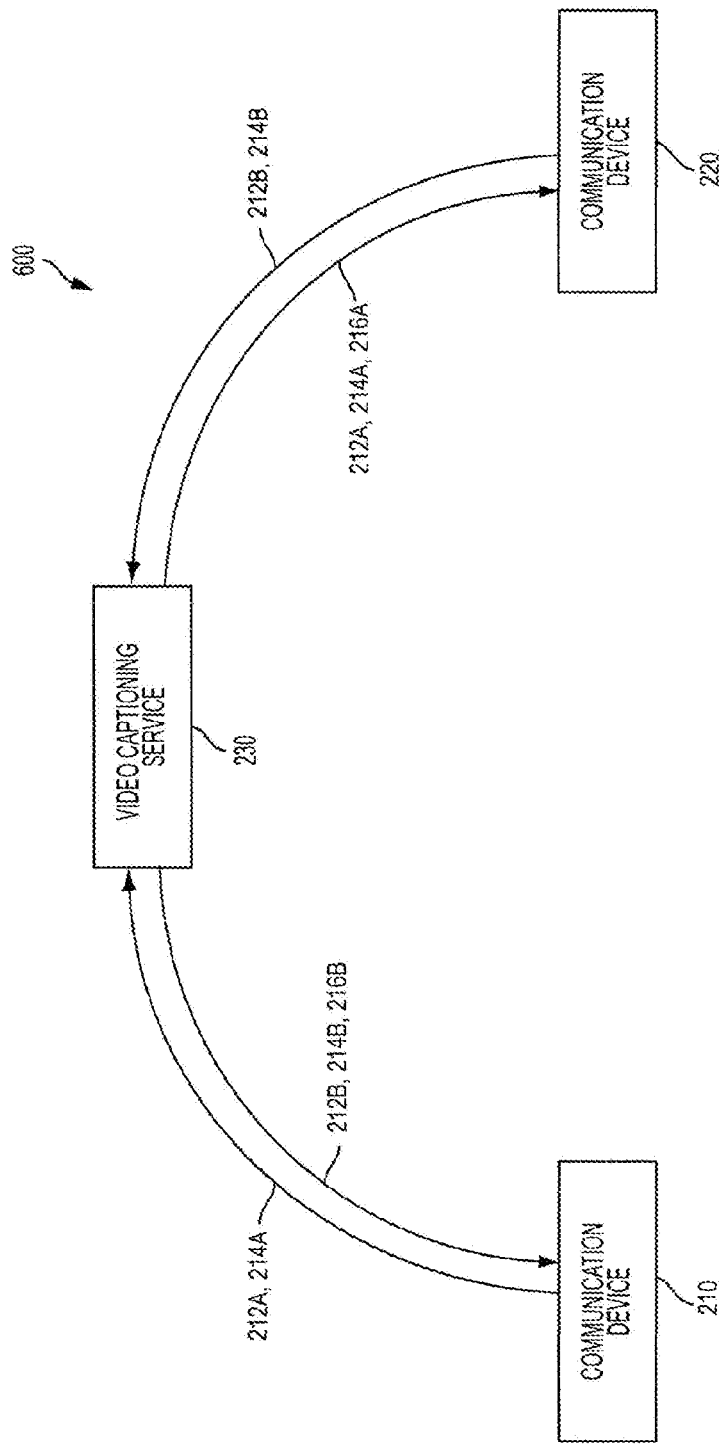

Referring specifically to FIG. 6, an embodiment is illustrated in which both the first communication device 210 and the second communication device 220 are receiving data and displaying text captions during the video communication session (e.g., both users are hearing-impaired users). In these and other embodiments, the media data (e.g., near-end video 212A, near-end audio 214A, far-end video 212B, far-end audio 214B) may be communicated between the first communication device 210 and the second communication device 220 through the video captioning service 230 rather than through a point-to-point connection. Such a configuration may be used to bypass a firewall on one side (e.g., NAT traversal) of the communication session. The video captioning service 230 may generate and send the corresponding text data 216A, 216B for the text captions forward to the first communication device 210 and the second communication device 220. For example, the text data 216A based on the near-end audio 214A from the first communication device 210 may be sent to the second communication device 220 and the text data 216B based on the far-end audio 214B from the second communication device 220 may be sent to the first communication device 210. In these and other embodiments, the video captioning service 230 may act as a router for the media data for the video communication session to pull the audio needed to generate the text transcriptions and the text data 216A, 216B. In some embodiments, the text data 216A, 216B may be sent separately from the media data so that the audio and video data may not be delayed while the text transcription and data is generated.

Additional embodiments may include one or more of the first communication device 210 or the second communication device 220 being configured to generate at least a portion of the text transcription using automatic speech recognition software tools. FIGS. 7 through 10 describe examples of such embodiments. Although these embodiments describe video data and a video captioning service, some embodiments in the present disclosure may automatically generate the text transcription locally on the first communication device 210 or the second communication device 220 in an audio-only communication session without the video data.

Figure 7:
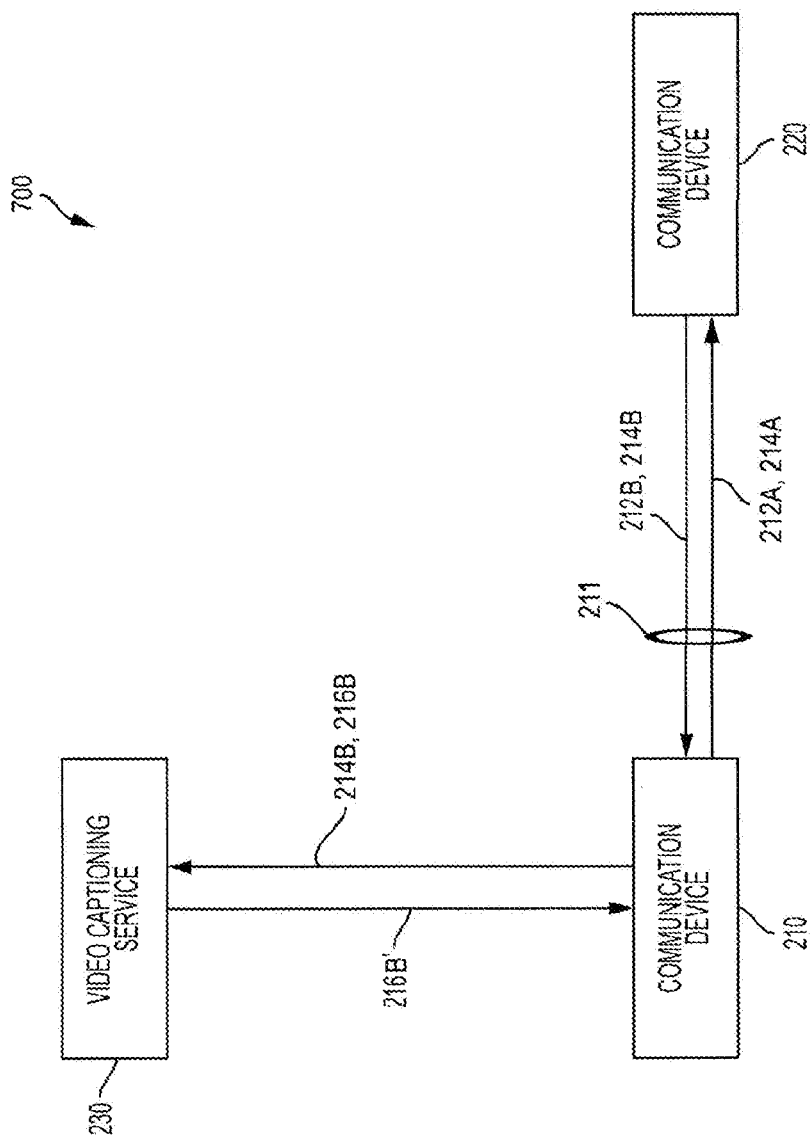

Referring specifically to FIG. 7, an embodiment is illustrated in which the first communication device 210 may be configured to automatically generate its own text transcription of the far-end audio 214B for display on the first communication device 210. The text transcription may be generated using automatic speech recognition software tools stored and operated by the first communication device 210. The text transcription may be displayed locally on the electronic display of the first communication device 210 as well as transmitted as text data 216B to the video captioning service 230 with the far-end audio 214B. Rather than generate the entire text transcription (e.g., via revoicing, etc.) the communication assistant at the video captioning service 230 may view the text transcription (generated by the first communication device 210) as text captions on their electronic display while listening to the far-end audio 214B. Thus, initially, the first communication device 210 and the video captioning service 230 may display the same text captions on both devices simultaneously. The call assistant may identify errors in the text captions and correct the errors by editing a block of text, from which the edited text data 216B' may be transmitted to the first communication device 210. The edited text data 216B' may replace the corresponding block in the text caption already displayed by the first communication device 210. Such error correction methods may include those described in U.S. Pat. No. 8,379,801, issued Feb. 19, 2013, and entitled "Methods and Systems Related to Text Caption Error Correction."

In some embodiments, the text captions may not initially be displayed on the first communication device 210 prior to transmitting the text data 216B to the video captioning service 230. In these and other embodiments, the edited text data 216B' may include the entire block of text for the text captions rather than just the portions of the text data that were edited.

Figure 8:
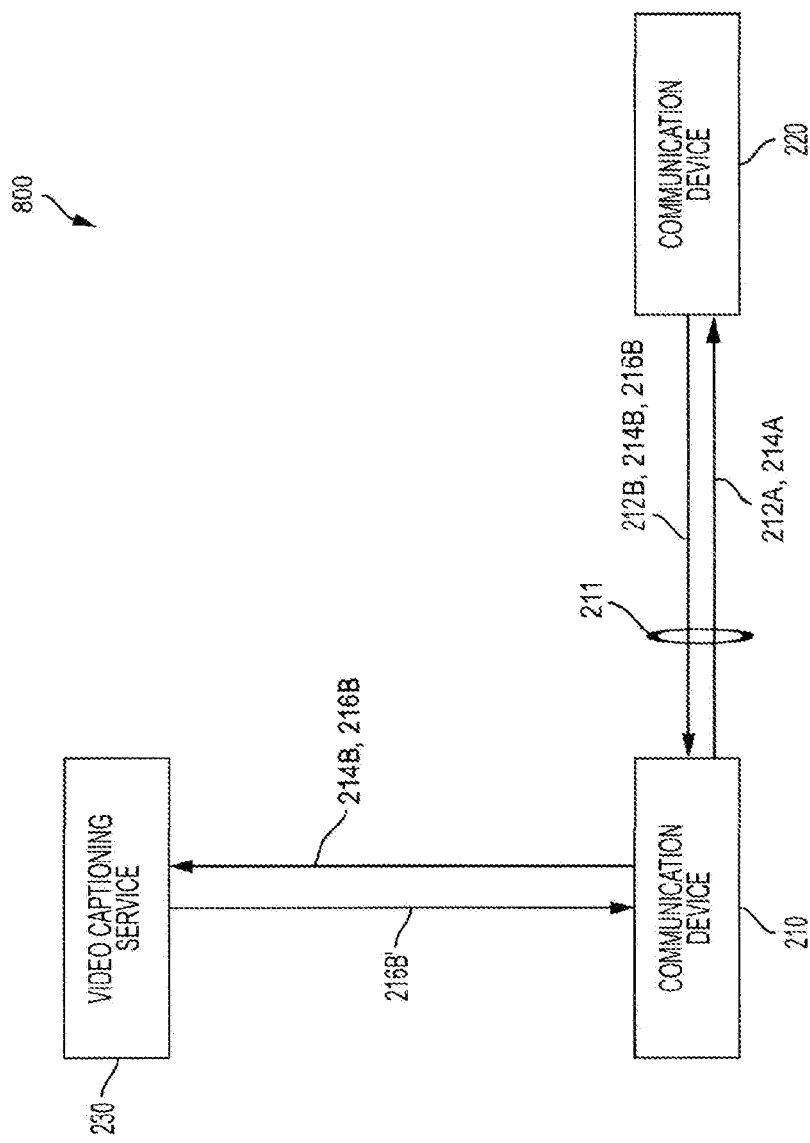

Referring specifically to FIG. 8, an embodiment is illustrated in which the second communication device 220 may be configured to automatically generate text transcription of the far-end audio 214B for transmission as text data 216B to the first communication device 210 with the media data 211. The text transcription may be generated using automatic speech recognition software tools stored and operated by the second communication device 220. The text transcription may be received and then displayed locally on the electronic display of the first communication device 210. The first communication device 210 may also transmit the text data 216B to the video captioning service 230 with the far-end audio 214B for generating the edited text data 216B' as discussed above with respect to FIG. 7.

Figure 9:
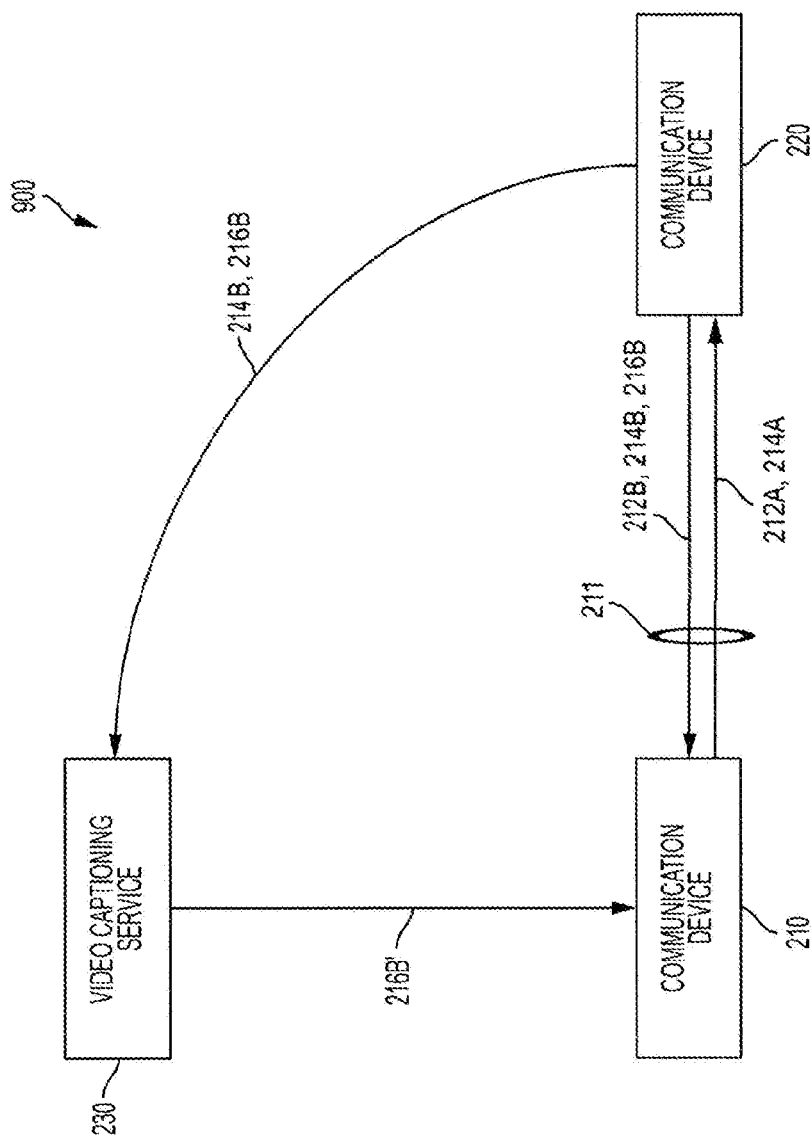

Referring specifically to FIG. 9, an embodiment is illustrated in which the second communication device 220 may be configured to automatically generate text transcription of the far-end audio 214B for transmission as text data 216B to the video captioning service 230 with the far-end audio 214B. The text data 216B may also be transmitted to the first communication device 210 with the media data 211. The text transcription may be generated using automatic speech recognition software tools stored and operated by the second communication device 220. The first communication device 210 may receive and display the text data 216B as text captions as discussed above. The video captioning service 230 may also receive the text data 216B with the far-end audio 214B and generate the edited text data 216B' to replace blocks of text displayed by the first communication device 210 containing errors as discussed above with respect to FIG. 7.

Figure 10:
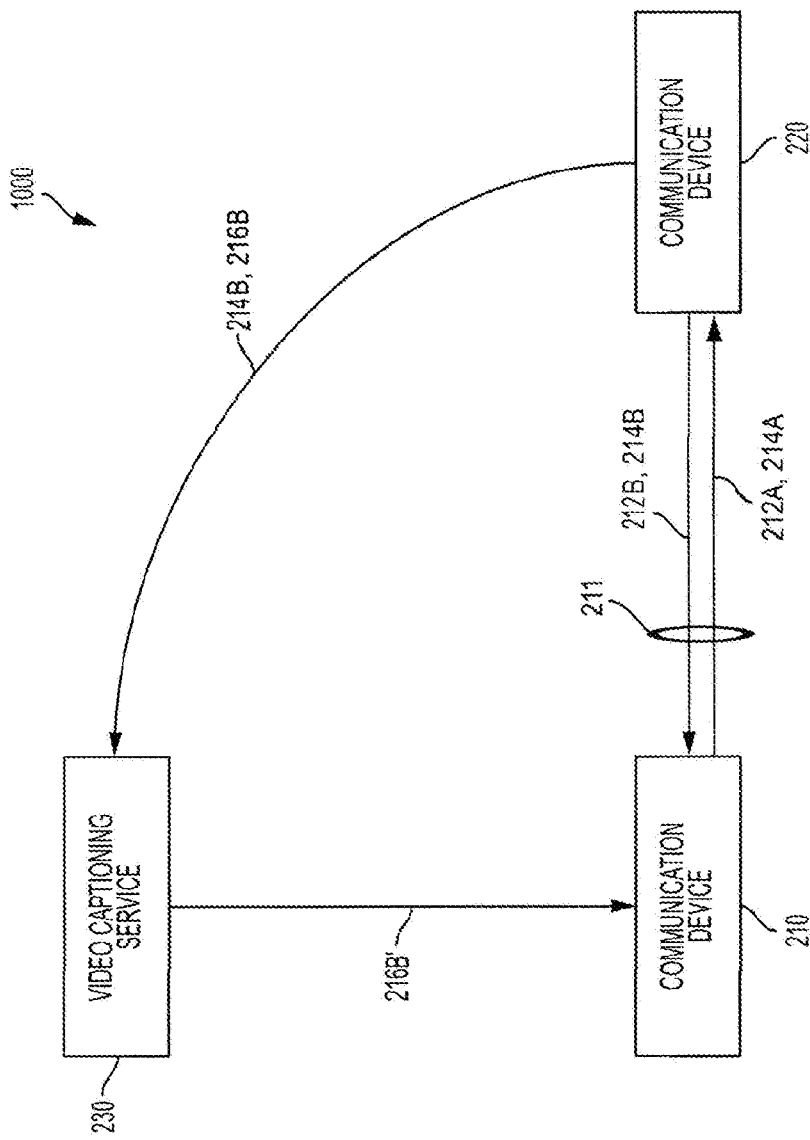

Referring specifically to FIG. 10, an embodiment is illustrated in which the second communication device 220 may be configured to automatically generate text transcription of the far-end audio 214B for transmission as text data 216B to the video captioning service 230 with the far-end audio 214B. The text transcription may be generated using automatic speech recognition software tools stored and operated by the second communication device 220. The video captioning service 230 may receive the text data 216B with the far-end audio 214B and generate the edited text data 216B' as discussed above with respect to FIG. 7. In these and other embodiments, the first communication device 210 may display the edited text data 216B', which may include the entire block of text for the text captions rather than just the portions of the text data that were edited.

Figure 11:
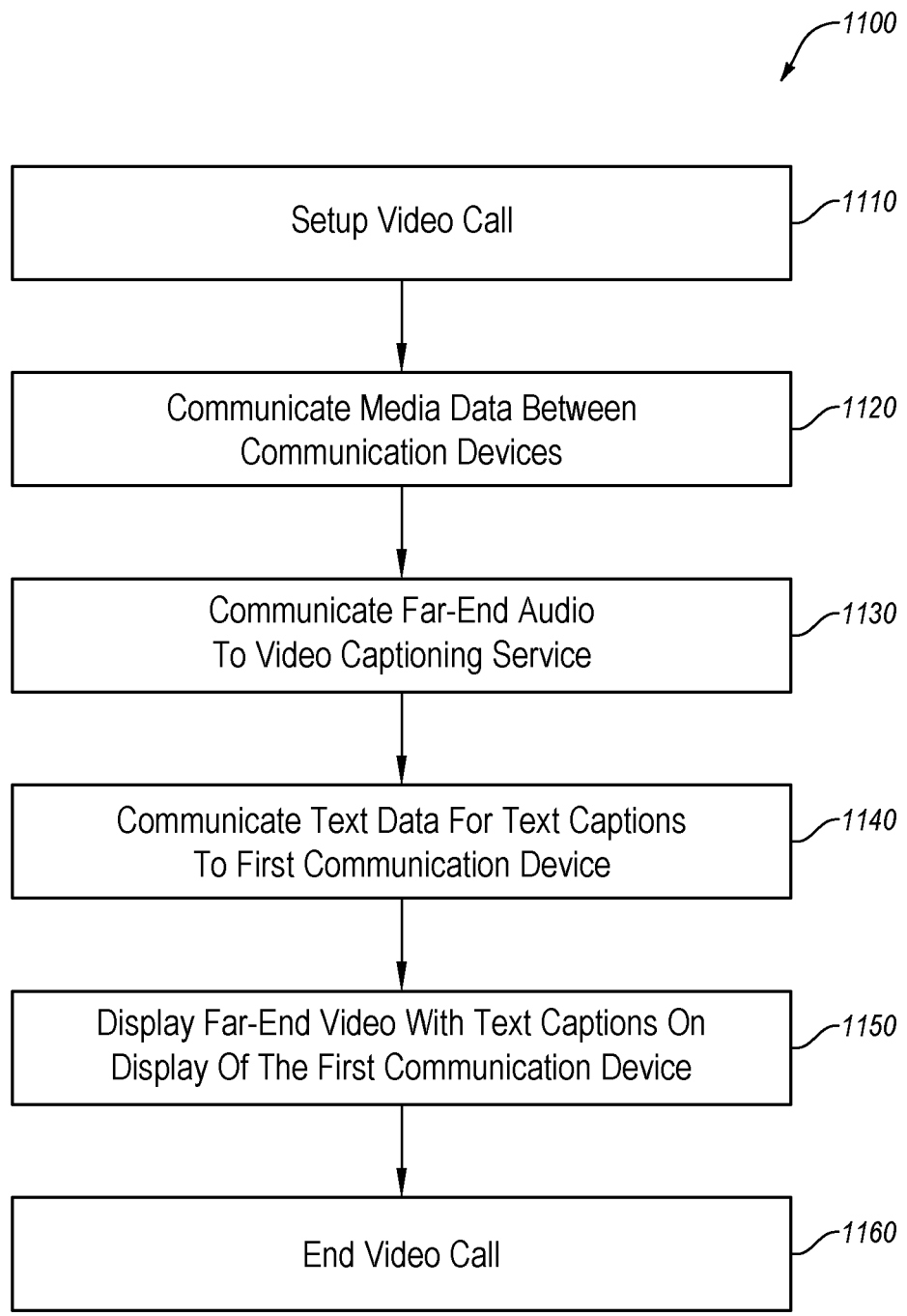
FIG. 11 is a flowchart illustrating a method for captioning a video communication session for a conversation between two users according to some embodiments of the disclosure.

FIG. 11 is a flowchart 1100 illustrating a method of captioning a video communication session for a conversation between at least two users according to an embodiment of the disclosure. The flowchart 1100 is given from the perspective of the first communication device that is configured to receive and display captions for a video communication session with the second communication device.

At operation 1110, a video call may be set up. As discussed above, the video call may be set up through a call set-up server that supplies each communication device with the information needed to communicate with each other (e.g., addresses, protocol information, etc.).

At operation 1120, media data may be communicated between communication devices. The media data may include the near-end audio/video and the far-end audio video. The media data may be communicated point-to-point between the communication devices in some embodiments (see, e.g., FIGS. 2 through 5). In other embodiments, the media data may be communicated through the video captioning service 230 (see, e.g., FIG. 6).

At operation 1130, the far-end audio may be communicated to the video captioning service. In some embodiments, the first communication device may route the far-end audio to the video captioning service. In other embodiments, the far-end audio may be sent to the video captioning service from another device, such as the second communication device.

At operation 1140, text data for text captions may be communicated to the first communication device. In some embodiments, the text data may be generated and transmitted by the video captioning service. The text data may include a text transcription of the far-end audio during the video communication session. In some embodiments, either the first communication device or the second communication device may generate at least a portion of the text transcription (e.g., FIGS. 7 through 10).

At operation 1150, the far-end video and the text captions may be displayed on the display of the first communication device. The text captions may be displayed as an overlay on the video data, in a separate window, in a portion of the interface dedicated to the text captions or through other presentation methods. The text captions may be displayed as the far-end audio is presented by the first communication device.

At operation 1160, the video call may be ended and the connections to the second communication device and the video captioning service may be terminated. Prior to ending the video call, operations 720 through 750 may continue.

Figure 12:
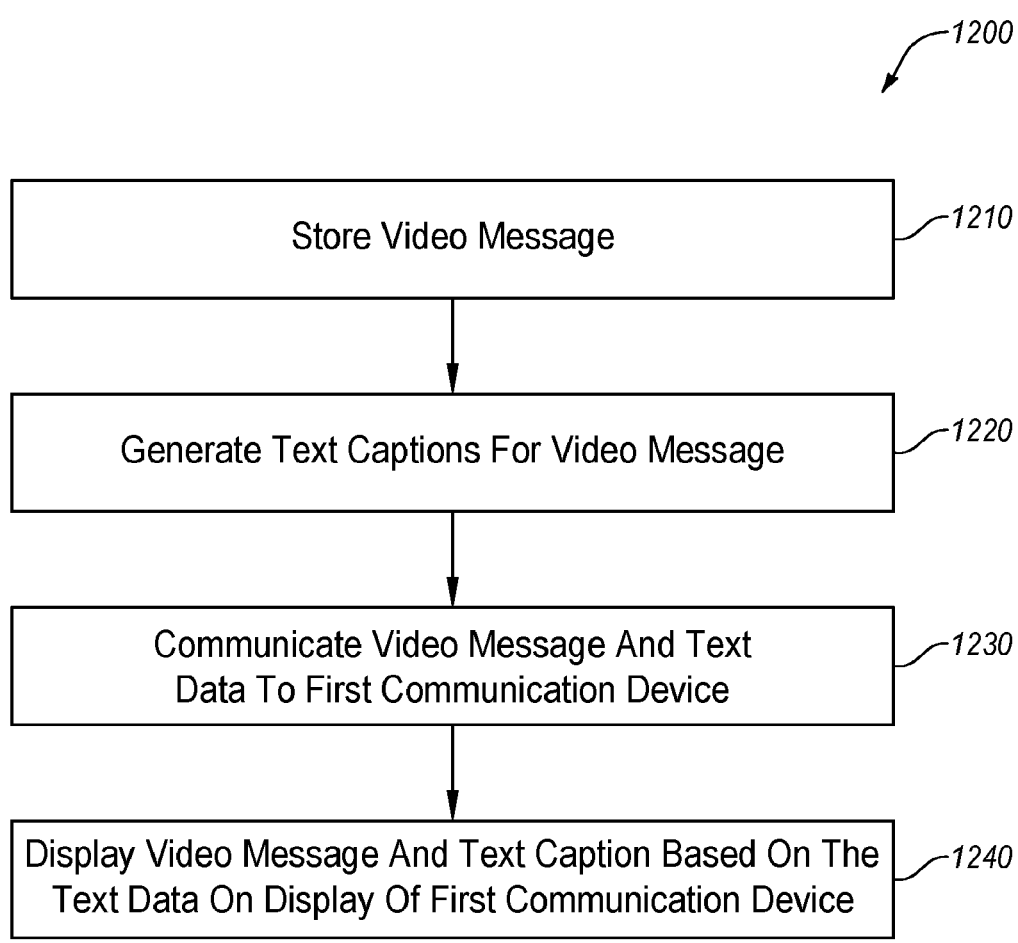
FIG. 12 is a flowchart illustrating a method for captioning a video mail message according to some embodiments of the disclosure.

FIG. 12 is a flowchart 1200 illustrating a method of captioning a video mail message according to an embodiment of the disclosure. This example is given from the perspective of a first communication device that is configured to receive text data and display text captions for a video mail message received from a second communication device.

At operation 1210, the video mail message may be generated and/or stored. In some embodiments, the video mail message may be stored on a remote server (e.g., a mail server) for retrieval during playback by the first communication device. In other embodiments, the video mail message may be stored locally by the first communication device for local playback.

At operation 1220, the text data may be generated for the video mail message. In some embodiments, the text data may be generated while the video mail message is being recorded and/or stored. In some embodiments, the text data may be generated during playback by providing audio from the video mail message to the video captioning services during remote streaming or local playback. The audio may be sent to the video captioning services via the first communication device, the mail server, or other device that includes or stores the audio.

At operation 1230, the video message and text data may be communicated to the first communication device. The video message and text data may be sent separately, as embedded data, or through other methods.

At operation 1240, the video message and text captions based on the text data may be displayed on the electronic display of the first communication device. The text captions may be displayed as an overlay on video of the video message, in a separate window, in a portion of the interface dedicated to the text captions or through other presentation methods. The text captions may be displayed as the audio from the video message is presented by the first communication device.

Figure 13:
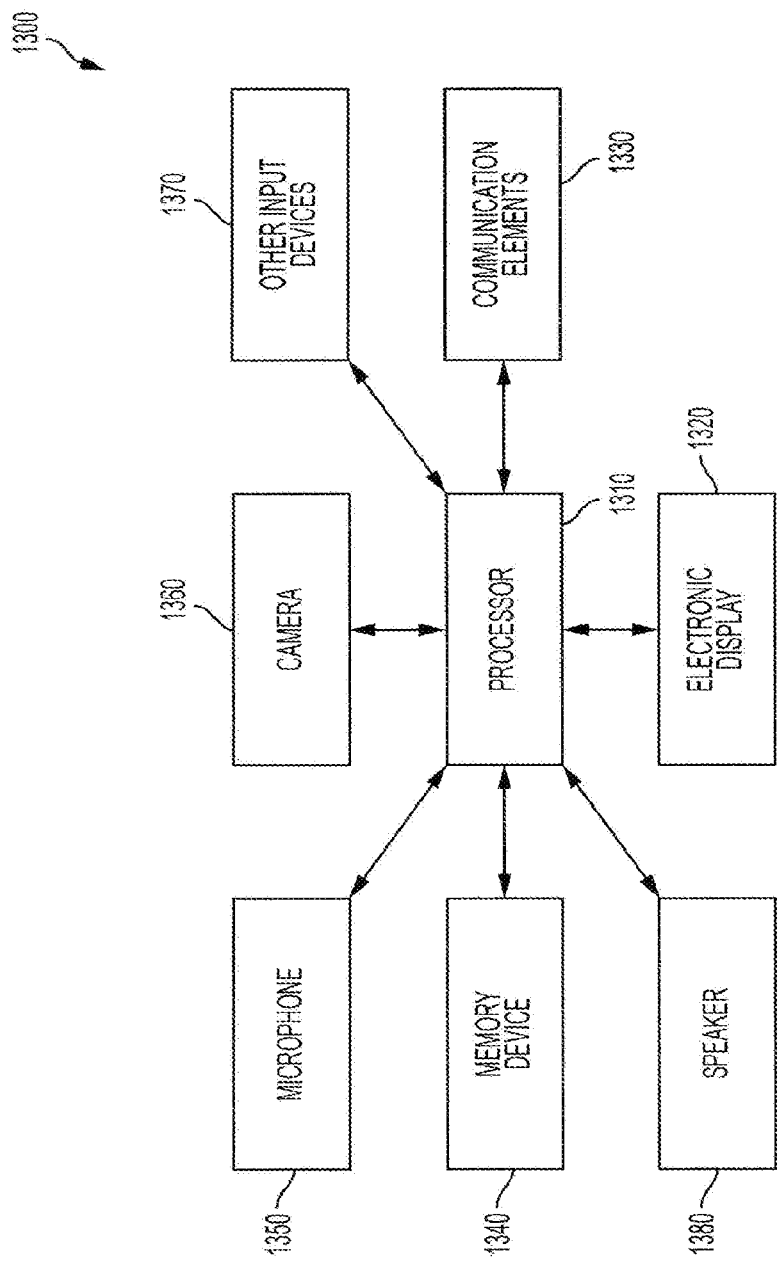
FIG. 13 is a simplified schematic block diagram of a communication device according to some embodiments of the disclosure.

FIG. 13 is a simplified schematic block diagram of a communication device 1300 associated with a hearing-impaired user according to an embodiment of the disclosure. For example, the communication device 1300 may be the first communication device 210, the second communication device 220 of FIG. 2, among other of the devices and components discussed in the present disclosure. In some embodiments, the communication device 1300 may be configured to establish video calls with other communication devices and to establish captioning communication sessions with a video captioning service configured to assist the hearing-impaired user. In some embodiments, the communication device 1300 may be a caption enabled communication device, which may be implemented as a standalone device (e.g., a caption phone), or as implemented on another device (e.g., tablet computer, laptop computer, smart phone, etc.). Alternately or additionally, the communication device 1300 may be a non-caption enabled communication device The communication device 1300 may include a processor 1310 operably coupled with an electronic display 1320, communication elements 1330, a memory device 1340, microphone 1350, camera 1360, other input devices 1370, and a speaker 1380. The processor 1310 may coordinate the communication between the various devices as well as execute instructions stored in computer-readable media of the memory device 1340. The processor 1310 may be configured to execute a wide variety of operating systems and applications including computing instructions. For example, the processor 1310 may interact with one or more of the components of the communication device 1300 to perform methods, operations, and other instructions performed in one or more of the embodiments disclosed in the present disclosure. In some embodiments, the processor 1310 may be multiple processors or a single processor.

The memory device 1340 may be used to hold computing instructions, data, and other information for performing a wide variety of tasks including performing methods, operations, and other instructions performed in one or more of the embodiments disclosed in the present disclosure. By way of example and not limitation, the memory device 1340 may include Synchronous Random Access Memory (SRAM), Dynamic RAM (DRAM), Read-Only Memory (ROM), Flash memory, and the like. The memory device 1340 may include volatile and non-volatile memory storage for the communication device 1300. In some embodiments, the memory device 1340 may be a non-transitory computer-readable media.

The communication elements 1330 may be configured to communicate with other devices or communication networks, including other communication devices and the video captioning service. As non-limiting examples, the communication elements 1330 may include elements for communicating on wired and wireless communication media, such as for example, serial ports, parallel ports, Ethernet connections, universal serial bus (USB) connections IEEE 1394 ("firewire") connections, Bluetooth wireless connections, 802.1 a/b/g/n type wireless connections, and other suitable communication interfaces and protocols. The other input devices 1370 may include a numeric keypad, a keyboard, a touchscreen, a remote control, a mouse, buttons, other input devices, or combinations thereof.

The microphone 1350 may be configured to capture audio. The camera may be configured to capture digital images. The digital images may be captured in a manner to produce video data that may be shared by the communication device 1300. In some embodiments, the speaker 1380 may broadcast audio received by the communication device 1300 or otherwise generated by the communication device 1300. The electronic display 1320 may be configured as one or more displays, like an LCD, LED, or other type display. The electronic display 1320 may be configured to present video, text captions, user interfaces, and other data as directed by the processor 1310.

Figure 14:
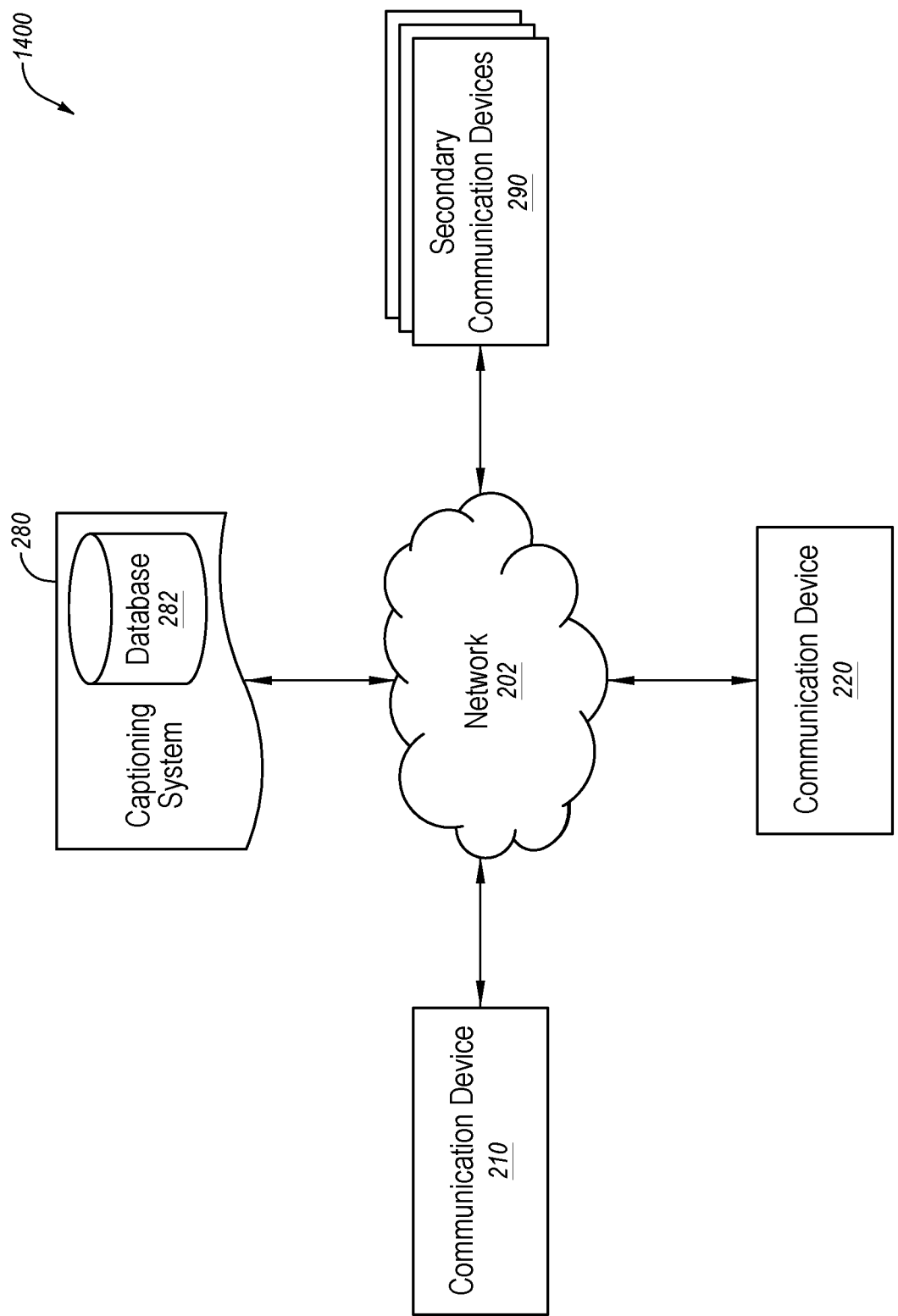
FIG. 14 is simplified block diagrams of a captioning communication system according to some embodiments of the disclosure.

FIG. 14 is simplified block diagrams of a captioning communication system 1400 according to some embodiments of the disclosure. The system 1400 may include the first communication device 210, the second communication device 220, a captioning system 280, and multiple secondary communication devices 290. The first communication device 210, the second communication device 220, the captioning system 280, and the multiple secondary communication devices 290 may be configured to be communicatively coupled by a network 202.

In some embodiments, the network 202 may be any network or configuration of networks configured to send and receive communications between devices. In some embodiments, the network 202 may include a conventional type network, a wired or wireless network, and may have numerous different configurations. Furthermore, the network 202 may include a local area network (LAN), a wide area network (WAN) (e.g., the Internet), or other interconnected data paths across which multiple devices and/or entities may communicate. In some embodiments, the network 202 may include a peer-to-peer network. The network 202 may also be coupled to or may include portions of a telecommunications network for sending data in a variety of different communication protocols. The network 202 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. Further, the network 202 may include one or more IEEE 802.11 wireless networks.

In some embodiments, the captioning system 280 may be analogous and include all or some of the functionality of the video captioning service 230 described in the present disclosure. In these and other embodiments, the first communication device 210 and the second communication device 220 may operate in conjunction with the captioning system 280 to provide text captions of a communication session between the first communication device 210 and the second communication device 220 in any manner as described with respect to embodiments of the present disclosure as illustrated in FIGS. 2-13. In these and other embodiments, the communication session between the first communication device 210 and the second communication device 220 may be an audio only or an audio and video communication session.

The secondary communication devices 290 may be devices similar to the first communication device 210 and/or the second communication device 220. For example, the secondary communication devices 290 may be devices that are specifically configured to assist a hearing-impaired user communicating with another individual. For example, the secondary communication devices 290 may be captioned enabled devices similar to the first communication device 210 and/or the second communication device 220.

In some embodiments, the one or more of the secondary communication devices 290 may be captioned enabled devices while other of the secondary communication devices 290 may not be captioned enabled devices. In these and other embodiments, the non-captioned enabled communication devices of the secondary communication devices 290 may be registered with the captioning system 280 to communicate with other captioned enabled communication devices or systems. For example, the non-captioned enabled communication devices of the secondary communication devices 290 may include an application to initiate an audio and/or video communication session with other captioned enabled communication devices.

In some embodiments, the captioning system 280 may include a database 282. The database 282 may be configured to store information about contact entries stored on the secondary communication devices 290, the first communication device 210, and/or the second communication device 220. In some embodiments, the database 282 may be configured to store information about contact entries stored on communication devices that are registered with the captioning system 280.

For example, the secondary communication devices 290 may be configured to allow a user to enter, update, or otherwise manipulate contact entries stored on the secondary communication devices 290. A contact entry may be a data set that includes a contact identifier. The contact identifier may be information such as a phone number or other information associated with a communication device that allows one of the secondary communication devices 290 to establish a communication session with the communication device. In some embodiments, the contact entry may include other information. For example, the contact entry may include information such as a first name and/or last name of an individual that is associated with the contact identifier. Alternately or additionally, the information in the contact entry may include a physical address, a network address, for example, an email address, a social media account, a private or public Internet (IP) protocol address, or some other electronic or networking address associated with the individual or the communication device. Alternately or additionally, the information in the contact entry may include other identifier information about the individual, such as a relationship between the individual and the owner of the one of the secondary communication devices 290.

In some embodiments, the secondary communication devices 290 may provide contact data about the contact entries stored in the secondary communication devices 290 to the captioning system 280. For example, in some embodiments, the secondary communication devices 290 may provide contact data regarding new, updated, or changed contact entries to the database 282 as a result of a change of contact entries on the secondary communication devices 290. Alternately or additionally, the secondary communication devices 290 may provide contact data to the database 282 periodically or based on some other schedule. In some embodiments, the captioning system 280 may query the secondary communication devices 290 randomly, periodically, or based on some other schedule, data, or result for all the contact entries or changes to the contact entries of the secondary communication devices 290. The captioning system 280 may store the contact data about the contact entries of the secondary communication devices 290 in the database 282.

In some embodiments, the database 282 may also associate the contact data with the origin of the contact data. For example, the database 282 may include information regarding which of the secondary communication devices 290 provided specific contact data. In some embodiments, the database 282 may include a cross-references such that contact identifiers for the secondary communication devices 290 and registered individuals associated with the secondary communication devices 290 may be associated with the contact data provided by the individual secondary communication devices 290. For example, a given secondary communication device 290 may have a phone number and be registered with a first individual. In these and other embodiments, the database 282 may store the contact data from the given secondary communication device 290 in a manner that associates the contact data with the phone number and/or first individual.

The captioning system 280 may use the contact data in the database 282 to provide contact information to communication devices that register or otherwise associate with the captioning system 280. For example, in some embodiments, a communication device, such as the first communication device 210 may receive a contact list from the captioning system 280. Using the contact list, the first communication device 210 may create contact entries for other communication devices registered with the captioning system 280.

In some embodiments, the contact list created by the captioning system 280 for the first communication device 210 may be based on an identifier provided by the first communication device 210. For example, the first communication device 210 may be registered or otherwise be known to the captioning system 280. The first communication device 210 may provide an identifier associated with the first communication device 210 to the captioning system 280. In some embodiments, the first communication device 210 may provide the identifier in response to a request from the captioning system 280 or in response to an invitation from another communication device.

Alternately or additionally, the captioning system 280 may use registration information used to register the first communication device 210 with the captioning system 280 as the identifier of the first communication device 210. In these and other embodiments, the first communication device 210 may not provide the identifier separately from the registration information.

The identifier associated with the first communication device 210 may be any information that may be included in contact entries stored in the database 282. For example, the identifier may include a phone number for a PSTN, cellular network, or VOIP network associated with the first communication device 210. Alternately or additionally, the identifier may include a first name and/or last name or other identifying information of an individual that is associated with the first communication device 210. Alternately or additionally, the identifier may include a physical address, a network address, for example, an email address, a social media account, a private or public IP address, or some other address associated with the individual, which is associated with the first communication device 210.

The captioning system 280 may receive the identifier from the first communication device 210. The captioning system 280 may search the database 282 using the identifier to determine contact data that includes the identifier. For example, the captioning system 280 may query the database 282 using the identifier to select the contact data that includes the identifier from all of or a subset of the contact data stored in the database 282. In some embodiments, the query may be a strict search rendering results that exactly match the identifier. Alternately or additionally, the query may be a loose search rendering results that exactly and partially match the identifier. The type of query may be selected based on the type of the identifier. For example, if the identifier is a name, the query may be implemented by a loose search to allow for different variations of the name. For example, if the identifier was the name "Camille" the results may provide contact data that includes the name "Cami" or "Camille." Alternately or additionally, if the identifier is a phone number or other alphanumeric identifier the query may be a strict query.

In some embodiments, the database 282 may return the origins of the selected contact data that include the identifier to the captioning system 280. For example, the contact data from a first secondary communication device 290 may include the identifier from the first communication device 210. The database 282 may include a contact identifier, such as a phone number of the first secondary communication device 290 and a name of an individual associated with the first secondary communication device 290. For example, the name of the individual associated with the first secondary communication device 290 may be a name of the individual registered with the captioning system 280 that is associated with the first secondary communication device 290. In these and other embodiments, the database 282 when queried with the identifier of the first communication device 210, the database 282 may search the contact data stored in the database 282 to determine the contact data that includes the identifier. In this example, the contact data that includes the identifier may have an origin or originate from the first secondary communication device 290. As a result, the contact data may be associated with the contact identifier of the first secondary communication device 290 and the contact identifier of the first secondary communication device 290 may be output by the database 282.

In some embodiments, the captioning system 280 may generate a contact list that includes the origins of the selected contact data. To generate the contact list, the captioning system 280 may organize the origins of the selected contact data into a contact list. In some embodiments, organizing the origins of the selected contact data may include packaging the origins of the selected contact data for transmittal to the first communication device 210. Alternately or additionally, organizing the origins of the selected contact data may include sorting and de-duplicating the origins of the selected contact data. Alternately or additionally, organizing the origins of the selected contact data may include annotating the origins to include additional information about the origins, such as if the secondary communication devices 290 associated with the origins is able to participate in video communications. In these and other embodiments, the contact list may include information to allow the first communication device 210 to form contact entries for the secondary communication devices 290 that included the first communication device 210 as a contact entry. For example, if a phone number of the first communication device 210 was included in contact entries in first and second secondary communication devices 290, the contact list may include the names and phone numbers associated with the first and second secondary communication devices 290. The captioning system 280 may provide the contact list to the first communication device 210.

In some embodiments, such as when the captioning system 280 is a video captioning system, the captioning system 280 may be configured to push updates to the contact entries that include the identifier of the first communication device 210. In these and other embodiments, the contact entries may be updated to indicate that the first communication device 210 may be configured for video communication sessions.

The first communication device 210 may be configured to receive the contact list. Using the contact list, the first communication device 210 may generate contact entries in the first communication device 210 that include the information from the contact list. The contact entries in the first communication device 210 may be used to establish communications sessions with the secondary communication devices 290 that included the identifier of the first communication device 210 in contact entries of the secondary communication devices 290.

An example of the operation of the system 1400 follows. The first communication device 210 may be a cell-phone of a hearing-capable user and the secondary communication devices 290 may be phones, such as a cell-phones or phone consoles, of hearing-impaired users. An invitation regarding registration and a video call application for establishing a communication session may be received by the first communication device 210. The first communication device 210 may register with the captioning system 280 and install the video call application for establishing the communication session. After receiving the invitation, and in some embodiments in response to receiving the invitation, the first communication device 210 may provide an identifier, such as a number associated with the first communication device 210, to the captioning system 280. In some embodiments, the invitation or the captioning system 280 may indicate to the first communication device 210 a type of data to provide as the identifier.

In some embodiments, the identifier may be a number that may be used to establish a communication session between the first communication device 210 and the second communication device 220 or the secondary communication devices 290. In some embodiments, the identifier used to establish the communication session may be a phone number provided to the first communication device 210 by a wireless service provider of the first communication device 210. Alternately or additionally, the identifier may be a voice-over-Internet-protocol (VOIP) number for a particular VOIP provider.

The identifier may be used by the captioning system 280 to query the database 282 to determine the secondary communication devices 290 that include the identifier in contact entries. The captioning system 280 may organize a contact list, indicating the names of individuals, and the numbers associated with the secondary communication devices 290 that included the identifier of the first communication device 210 in their contact entries. In short, the contact list may indicate people that have the first communication device 210 as a contact on their devices. The captioning system 280 may provide the contact list to the first communication device 210. The first communication device 210 may provide the contact list as contact entries in the first communication device 210.

In some embodiments, the first communication device 210 may only be able to establish a communication session with the secondary communication devices 290 and/or the second communication device 220 based on the application provided to the first communication device 210 using the contact entries generated based on the received contact list. In these and other embodiments, the captioning system 280 may thus restrict the usage of the first communication device 210 to communicating with those secondary communication devices 290 that have the first communication device 210 as a contact entity. As a result, the communication sessions established through the application, which may be video communication sessions established through the captioning system 280 may be used only for communications between the non-hearing impaired user of the first communication device 210 and a hearing impaired user of one of the secondary communication devices 290.

In some embodiments, only providing contact information for those secondary communication devices 290 to the first communication device 210 that include the first communication device 210 may increase the security of the system 1400. For example, any device that may obtain the application and register may not obtain contact information for the secondary communication devices 290. The first communication device 210 in these embodiments may query the captioning system 280 for information but would not receive any contact information for the other communication devices registered with the system 1400 unless those registered devices included the first communication device 210 as a contact.

Further security may be added to the system 1400 by limiting the establishment of communication sessions by the first communication device 210 to be between the first communication device 210 and the contact entries formed from the contact list received by the first communication device 210. In these and other embodiments, even if contact information or an identifier number, such as a phone or connection establishment number, was discovered for other secondary communication devices 290, the first communication device 210 would be unable to establish a communication session through the captioning system 280 unless the other secondary communication devices 290 included the first communication device 210 as a contact.

Modifications, additions, or omissions may be made to the system 1400 without departing from the scope of the present disclosure. For example, in some embodiments, the system 1400 may also include a call set-up server, a presence server, and/or a mail server that may be configured to execute in a similar manner as discussed above with respect to FIG. 2.

Figure 15:
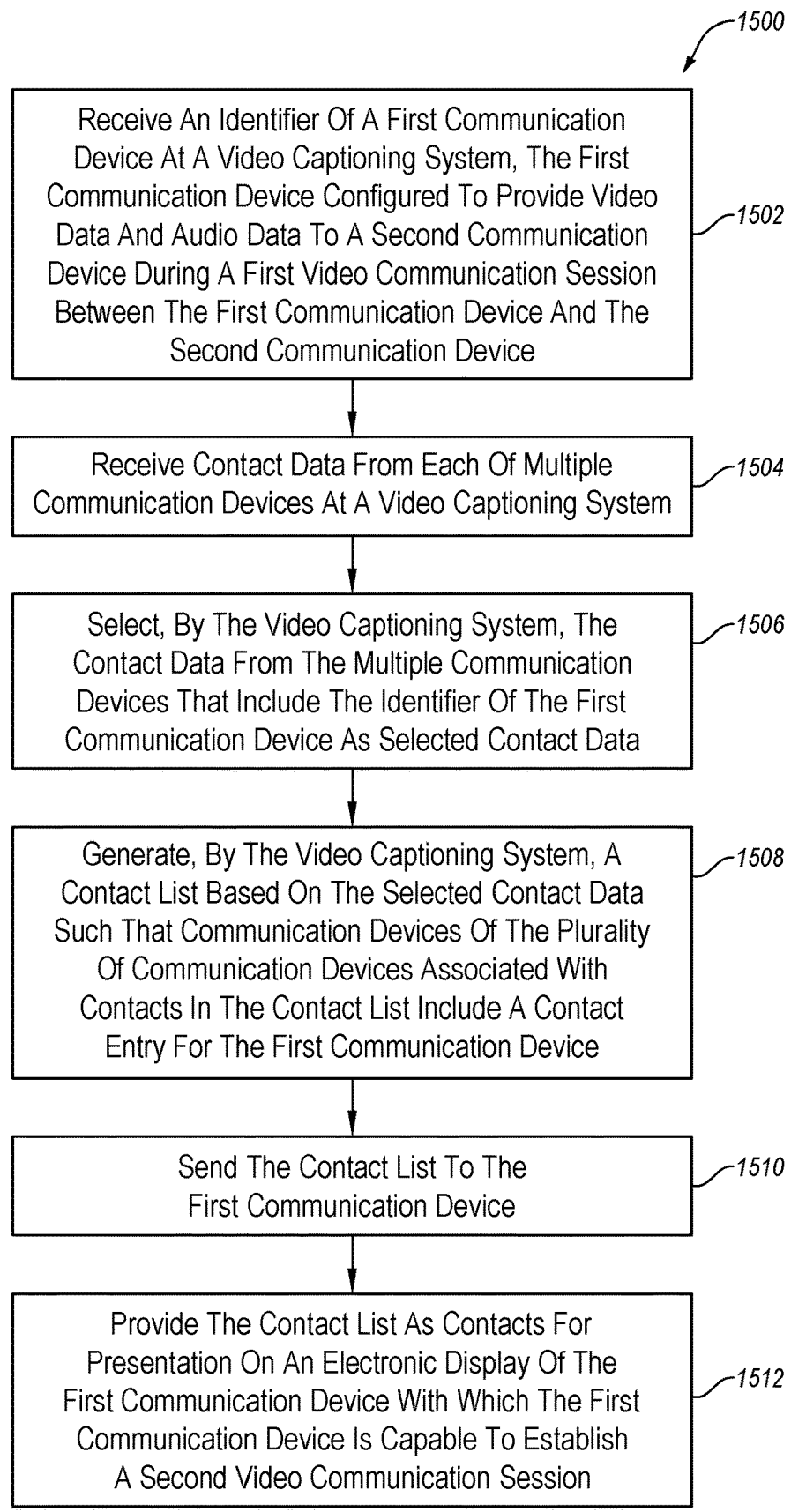
FIG. 15 is a flowchart illustrating a method to generate a contact list in a captioning communication system according to some embodiments of the disclosure.

FIG. 15 is a flowchart of an example method 1500 to generate a contact list in a captioning communication system. The method 1500 may be arranged in accordance with at least one embodiment described in the present disclosure. The method 1500 may be performed, in some embodiments, by a system, such as the system 1400 of FIG. 14 among other Figures described in the present disclosure. In these and other embodiments, the method 1500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 1500 may begin at block 1502, where an identifier of a first communication device may be received at a video captioning system. In some embodiments, the first communication device may be configured to provide video data and audio data to a second communication device during a first video communication session between the first communication device and the second communication device. In these and other embodiments, the second communication device may be configured to receive first text data of the audio data from the video captioning system and to receive the video data and audio data during the first video communication session. In some embodiments, the first communication device may be associated with a hearing capable user that is not authorized to receive text data from the video captioning system during the first video communication session. In some embodiments, the identifier of the first communication device may be a contact number associated with the first communication device. For example, the identifier of the first communication device may be a phone number or other identifying data associated with the first communication device.

In block 1504, contact data may be received from each of multiple communication devices at the video captioning system. The contact data may be retrieved from contact entries stored in the multiple communication devices. In some embodiments, the multiple communication devices may not include the first communication device and may be configured to receive text data from the video captioning system during video communication sessions. In some embodiments, the multiple communication devices may include the second communication device. In some embodiments, for each of the multiple communication devices the contact data may include a contact number from one or more of the contact entries.

In block 1506, contact data from the multiple communication devices that include the identifier of the first communication device may be selected by the video captioning system as selected contact data.

In block 1508, a contact list may be generated by the video captioning system based on the selected contact data such that communication devices of the multiple communication devices associated with contacts in the contact list include a contact entry for the first communication device.

In block 1510, the contact list may be sent to the first communication device. In block 1512, the contact list may be provided as contacts for presentation on an electronic display of the first communication device with which the first communication device is capable to establish a second video communication session.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 1500 may further include sending an invitation from the second communication device to the first communication device based on the second communication device including a contact entry for the first communication device. In these and other embodiments, the invitation may regard downloading of a video call application and registration with the video captioning system. In these and other embodiments, the identifier of the first communication device may be received at the video captioning system in response to the registration of the first communication device with the video captioning system.

In some embodiments, the method 1500 may further include sending a notification to the multiple communication devices that include the identifier of the first communication device to indicate that the first communication device is configured for video communication sessions.

In some embodiments, the method 1500 may further include requesting, by the first communication device, a second communication session with a third communication device of the multiple communication devices using a contact entity for the third communication device in the contact list received by the first communication device. In these and other embodiments, the method 1500 may further include communicating first text data from the video captioning system to a third communication device of the multiple communication devices after the first communication device and the third communication device establish a second video communication session. In some embodiments, the first text data may be based on audio data from the first communication device.

As discussed in the present disclosure, in some embodiments a communication device specifically configured for use by a hearing-impaired user may be provided. The communication device may include a microphone configured to generate near-end audio, a camera configured to generate near-end video; communication elements configured to communicate media data with a second communication device and receive text data from a video captioning service during a video communication session, an electronic display, and a processor. The communication elements may be configured to transmit the near-end audio and the near-end video to the second communication device, receive far-end audio and far-end video from the second communication device, and receive the text data from the video captioning service, the text data including a text transcription of the far-end audio. The electronic display may be configured to display the text data as text captions along with the far-end video during the video communication session. The processor may be operably coupled with the microphone, the camera, the communication elements, and the electronic display, and configured to control the operation thereof in communicating with the second communication device and the video captioning service during the video communication session. In these and other embodiments, the second communication device may be associated with a hearing-capable user that is not authorized to receive text data from the video communication service during the video communication session.

In some embodiments, a video captioning communication system may include a far-end communication device that may be configured to generate audio data and video data transmitted to a near-end communication device during a real-time video communication session with the near-end communication device. The system may also include a video captioning service that may be configured to receive the far-end audio and generate text data from a text transcription of the far-end audio and to transmit the text data to the near-end communication device during the video communication session. The far-end communication device may be associated with a hearing-capable user that is not authorized to receive text data during the video communication session.

In some embodiments, a method is disclosed for captioning a video communication session for a conversation between at least two users. The method may include setting up a video communication session between a first communication device and a second communication device. The method may also include communicating media data between the first communication device and the second communication device during the video communication session, the media data including near-end audio and near-end video from the first communication device and far-end audio and far-end video from the second communication device. The method may further include communicating the far-end audio to a video captioning service during the video communication session through a video call application stored on the second communication device that is not authorized to receive text data from the video captioning service and communicating text data from the captioning communication service to the first communication device corresponding to a text transcription of the far-end audio during the video communication session. The method may further include displaying the text data as text captions and the far-end video on an electronic display of the first communication device during the video communication session.

In some embodiments, a method for captioning a communication session for a conversation between at least two users is disclosed. The method may include setting up a communication session between a first communication device and a second communication device and communicating media data between the first communication device and the second communication device during the video communication session. The media data may include near-end audio from the first communication device and far-end audio from the second communication device. The method may further include communicating the far-end audio to a video captioning service during the communication session through at least one of a video call application stored on the second communication device that is not authorized to receive text data from the captioning service or through the first communication device and communicating locally generated text data to the captioning communication service from at least one of the first communication device or the second communication device. The method may further include communicating edited text data from the captioning communication service to the first communication device and displaying the edited text data as text captions on an electronic display of the first communication device during the communication session. The text captions may correspond to a text transcription of the far-end audio during the communication session.

In the detailed description, reference is made to the accompanying drawings which form a part hereof, and in which is illustrated specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions, rearrangements, or combinations thereof within the scope of the disclosure may be made and will become apparent to those of ordinary skill in the art.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method. In addition, like reference numerals may be used to denote like features throughout the specification and figures.

Information and signals described in the present disclosure may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals. In some embodiments, the bus may have a variety of bit widths and the disclosure may be implemented on any number of data signals including a single data signal.

The various illustrative logical blocks, modules, circuits, and algorithm acts described in connection with embodiments disclosed in the present disclosure may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described in the present disclosure.

A processor in the present disclosure may be any processor, controller, microcontroller, or state machine suitable for carrying out processes of the disclosure. A processor may also be implemented as a combination of computing devices, such as a combination of a DSP and a microprocessor, a plurality of microprocessors, one or more microprocessors in conjunction with a DSP core, or any other such configuration. When configured according to embodiments of the disclosure, a special-purpose computer improves the function of a computer because, absent the disclosure, the computer would not be able to carry out the processes of the disclosure. The disclosure also provides meaningful limitations in one or more particular technical environments that go beyond an abstract idea. For example, embodiments of the disclosure provide improvements in the technical field of telecommunications, particularly in a telecommunication system including a video captioning service for providing text data for display of text captions to a caption-enabled communication device to assist hearing-impaired users during video communication sessions. Embodiments include features that improve the functionality of the communication device such that new communication device, system, and method for establishing video captioning communication sessions are described. As a result, the interaction of the communication device with the captioning service may be improved with new functionality, particularly in the ability to communicate in a closed system with registered hearing-capable users.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, interfacing with an operating system, etc. Furthermore, the methods disclosed in the present disclosure may be implemented in hardware, software, or both. If implemented in software, the functions may be stored or transmitted as one or more instructions (e.g., software code) on a computer-readable medium. Computer-readable media includes both computer storage media and communication media including any medium that facilitates transfer of a computer program from one place to another.

It should be understood that any reference to an element in the present disclosure using a designation such as "first," "second," and so forth does not limit the quantity or order of those elements, unless such limitation is explicitly stated. Rather, these designations may be used in the present disclosure as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While certain illustrative embodiments have been described in connection with the figures, those of ordinary skill in the art will recognize and appreciate that embodiments encompassed by the disclosure are not limited to those embodiments explicitly shown and described in the present disclosure. Rather, many additions, deletions, and modifications to the embodiments described in the present disclosure may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A method to transcribe videos, the method comprising:
    obtaining, at a first communication device, a video that includes video data and audio data, the video originating at a second communication device and provided to the first communication device as part of a communication session between the first communication device and the second communication device;
    separating, by the first communication device, the audio data from the video;
    sending, to a remote system from the first communication device, the audio data from the video without sending the video data to the remote system, wherein the video is obtained at the first communication device through a point-to-point connection between the first communication device and the second communication device without the video passing through the remote system;
    in response to sending the audio data, obtaining, at the first communication device, text data originating from the remote system, the text data including a transcription of at least a portion of the audio data; and
    presenting, by the first communication device, the video, including the video data and the audio data, concurrently with the text data in real-time during the communication session.

2. The method of claim 1, wherein the text data is obtained at the first communication device through a connection between the remote system and the first communication device that does not include the second communication device.

3. The method of claim 1, further comprising:
    obtaining second text data that includes a second transcription of the audio data; and
    sending, to the remote system, the second text data, such that the remote system receives the second text data and the audio data, wherein the text data originating from the remote system includes corrections to the second text data.

4. The method of claim 3, wherein the second text data is generated by the first communication device using speech recognition software.

5. The method of claim 3, wherein the video is presented concurrently with the second text data and the text data.

6. At least one non-transitory computer readable media configured to store one or more instructions that when executed by at least one computing system cause or direct the at least one computing system to perform the method of claim 1.

7. A device comprising:
    one or more processors;
    one or more computer-readable media coupled to the one or more processors, the one or more computer-readable media including instructions, that in response to being executed by the one or more processors, cause or direct the device to perform operations, the operations comprising:
  obtain a video that includes video data and audio data, the video originating at a remote device and provided to the device as part of a communication session between the remote device and the device;
  separate the audio data from the video;
  send, to a remote system, the audio data from the video without sending the video data to the remote system, wherein the video is obtained at the device through a point-to-point connection between the device and the remote device without the video passing through the remote system; and
  obtain text data originating from the remote system, the text data including a transcription of at least a portion of the audio data; and
a display configured to present the video data concurrently with the text data in real-time during the communication session.

8. The device of claim 7, wherein the operations further comprise send, to the remote system, second text data that includes a second transcription of the audio data, such that the remote system receives the second text data and the audio data, wherein the text data originating from the remote system includes corrections to the second text data.

9. The device of claim 8, wherein the operations further comprise generate the second text data using speech recognition software.

10. The device of claim 8, wherein the display is configured to present the video concurrently with the second text data and the text data.

11. The device of claim 7, further comprising:
  a camera configured to capture second video data; and
  a microphone configured to capture second audio data, the second video data and the second audio data forming second video,
  wherein the operations further comprise send the second video to the remote device as part of the communication session between the remote device and the device.

12. A transcription service comprising:
one or more processors;
one or more computer-readable media coupled to the one or more processors, the one or more computer-readable media including instructions, that in response to being executed by the one or more processors, cause or direct the transcription service to perform operations, the operations comprising:
  establish a point-to-point video communication session between a first communication device and a second communication device that are separate from the transcription service, wherein second video obtained by the first communication device during the video communication session does not pass through the transcription service;
  obtain, at the transcription service from the first communication device, second audio data of the second video without second video data of the second video;
  obtain text data of the second audio data, the text data including a transcription of the second audio data; and
  direct the text data to the first communication device for presentation of the text data by the first communication device concurrently with presentation of the second video by the first communication device in real-time during the video communication session.

13. The transcription service of claim 12, wherein the second audio data of the second video is obtained at the transcription service from the first communication device through a connection between the transcription service and the first communication device that is separate from the point-to-point video communication session between the first communication device and the second communication device.

14. The transcription service of claim 12, wherein obtaining the text data includes generating the text data based on the second audio data using speech recognition software.

* * * * *